US012716835B2

(12) United States Patent
Ratcliffe et al.

(10) Patent No.: US 12,716,835 B2

(45) Date of Patent: Aug. 25, 2026

(54) SPECTROSCOPIC ANALYSIS OF ROCKS

(71) Applicant: Chevron U.S.A. Inc., San Ramon, CA (US)

(72) Inventors: Kenneth Thomas Ratcliffe, Welshpool (GB); Luke Morgan, Welshpool (GB); Paul Montgomery, Bricklehampton (GB); Timothy B. Fischer, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 332 days.

(21) Appl. No.: 18/003,440

(22) PCT Filed: Jul. 1, 2020

(86) PCT No.: PCT/US2020/040536

§ 371 (c)(1),
(2) Date: Dec. 27, 2022

(87) PCT Pub. No.: WO2022/005474

PCT Pub. Date: Jan. 6, 2022

(65) Prior Publication Data

US 2023/0266241 A1 Aug. 24, 2023

(51) Int. Cl.
*G01N 21/35* (2014.01)
*G01N 21/3563* (2014.01)

(52) U.S. Cl.
CPC . *G01N 21/3563* (2013.01); *G01N 2021/3595* (2013.01); *G01N 2201/129* (2013.01)

(58) Field of Classification Search
CPC ....... G01N 21/3563; G01N 2021/3595; G01N 2201/129
See application file for complete search history.

(56) References Cited

U.S. PATENT DOCUMENTS 7,126,340 B1 10/2006 Ameen
8,909,508 B2 12/2014 Hurley
(Continued)

FOREIGN PATENT DOCUMENTS

CN 104181603 A 12/2014
CN 103257081 B 9/2015
(Continued)

OTHER PUBLICATIONS

Zhao et al., Cross-Scale Molecular Analysis of Chemical Heterogeneity in Shale Rocks, Scientific Reports | (2018) 8:2552 | DOI:10.1038/s41598-018-20365-6, www.nature.com/scientific reports, Accepted; Jan. 10, 2018, Published online: Feb. 7, 2018) (Year: 2018).*

(Continued)

*Primary Examiner* — Hugh Maupin

(74) *Attorney, Agent, or Firm* — Marie L. Clapp

(57) ABSTRACT

The present disclosure concerns methods of identifying and quantifying constituent phases in rock samples based on spectroscopic measurements, methods of determining values of pyrolysis parameters for rock samples based on spectroscopic measurements, and methods of determining amounts of organic phases in rock samples based on spectroscopic measurements, as well as associated computer programs, computer-readable media, data carrier signals and data sets, and methods of compiling associated data sets for use in such methods.

24 Claims, 14 Drawing Sheets

(56) References Cited

U.S. PATENT DOCUMENTS

| | | | | |
|---|---|---|---|---|
| 9,528,874 | B2 | 12/2016 | Larter | |
| 10,515,715 | B1 | 12/2019 | Pappas | |
| 10,705,019 | B2 | 7/2020 | Humfeld | |
| 10,927,671 | B1 * | 2/2021 | Tonner | E21B 21/01 |
| 11,262,302 | B2 | 3/2022 | Humfeld | |
| 11,860,093 | B2 | 1/2024 | Humfeld | |
| 2003/0154044 | A1 * | 8/2003 | Lundstedt | G01N 35/00871 702/181 |
| 2008/0059140 | A1 * | 3/2008 | Salmon | G16C 10/00 703/12 |
| 2009/0084604 | A1 | 4/2009 | Polizzotti | |
| 2009/0103677 | A1 | 4/2009 | Wood | |
| 2009/0178439 | A1 | 7/2009 | Bauer | |
| 2010/0326669 | A1 | 12/2010 | Zhu | |
| 2012/0226653 | A1 | 9/2012 | Mclaughlin | |
| 2013/0046469 | A1 | 2/2013 | Herron | |
| 2013/0144561 | A1 | 6/2013 | Harb | |
| 2013/0179080 | A1 | 7/2013 | Skalinski | |
| 2013/0182819 | A1 * | 7/2013 | Dvorkin | G01N 23/046 378/5 |
| 2013/0270011 | A1 * | 10/2013 | Akkurt | E21B 49/088 175/58 |
| 2014/0088876 | A1 | 3/2014 | Shiley | |
| 2014/0100833 | A1 | 4/2014 | Williams | |
| 2014/0376685 | A1 | 12/2014 | Koroteev | |
| 2015/0104078 | A1 | 4/2015 | Varslot | |
| 2015/0235376 | A1 | 8/2015 | Derzhi | |
| 2015/0310140 | A1 | 10/2015 | Hoda | |
| 2016/0018556 | A1 | 1/2016 | Montgomery | |
| 2016/0139293 | A1 * | 5/2016 | Misra | G01V 3/30 702/7 |
| 2016/0349174 | A1 * | 12/2016 | Washburn | G01N 29/46 |
| 2017/0067337 | A1 | 3/2017 | Havens | |
| 2017/0235016 | A1 | 8/2017 | Prioul | |
| 2017/0248011 | A1 | 8/2017 | Craddock | |
| 2018/0031732 | A1 | 2/2018 | Mosse | |
| 2018/0321416 | A1 * | 11/2018 | Freedman | G01V 3/32 |
| 2018/0347354 | A1 | 12/2018 | Li | |
| 2018/0364381 | A1 | 12/2018 | Raterman | |
| 2019/0072534 | A1 | 3/2019 | Simon | |
| 2019/0143454 | A1 | 5/2019 | Choi | |
| 2019/0285560 | A1 | 9/2019 | Lenz | |
| 2019/0339248 | A1 | 11/2019 | Chen | |
| 2020/0408090 | A1 * | 12/2020 | Kadayam Viswanathan | G01N 24/08 |
| 2021/0349070 | A1 | 11/2021 | Gettemy | |

FOREIGN PATENT DOCUMENTS

| | | | |
|---|---|---|---|
| CN | 106124602 | B | 9/2017 |
| CN | 111189830 | B | 8/2022 |
| WO | 2015070022 | W | 5/2015 |
| WO | 2019204555 | A1 | 10/2019 |

OTHER PUBLICATIONS

PCT International Search Report and Written Opinion, mailed on Sep. 30, 2020, issued in International Application No. PCT/US2020/040536, filed on Jul. 1, 2020, 12 pages.

Boyle et al. (Rapid elemental analysis of sediment samples by isotope source XRF, 2000) (Year: 2000).

Dong et al. e (Quartz types and origins in the paleozoic Wufeng-Longmaxi Formations, Eastern Sichuan Basin, China: Implications for porosity preservation in shale reservoirs, 2019) (Year: 2019).

El Gezeery T et al: "Innovative Geosteering Technology Utilized in Drilling Smart Multi-lateral Wells, Kuwait", Offshore Technology Conference, Mar. 28, 2025 (Mar. 28, 2025), XP093264783.

Gramin, P, et al., Evaluation of the Impulse Hammer Technique for Core Mechanical Properties Profiling, presented at the International Symposium of the Society of Core Analysts, Snowmass, Colorado, USA, Aug. 21-26, 2016.

Jonathan Rocheleau et al., "Source Rock Characterization of the Carboniferous Golata Formation and Devonia Besa River Formation Outcrops, Liard Basin, Northwest Territories," Datapages/Search and Discovery Article #90224 GeoConvention, 2014, Focus—Adapt, Refine, Sustain Calgary, Alberta, canada, May 12-16, 2014.

Khamis et al. "Thermoluminescence Characteristics of Natural Quartz and Synthesized Silica Glass Prepared by Sol-Gel Technique", AJOPACS, 3(1): 1-16, 2017; Article No. AJOPACS.35542.

Kylander et al., "High-resolution X-ray fluorescence core scanning analysis of Les Echets (France) sedimentary sequence: new insights from chemical proxies," 2010.

Li Chunxiao et al: "Multi-scale evaluation of mechanical properties of the Bakken shale", Journal of Material Science, Kluwer Academic Publishers, Dordrecht, vol. 54, No. 3, Sep. 25, 2018 (Sep. 25, 2018), pp. 2133-2151, XP036636627, ISSN: 0022-2461, DOI: 10.1007/S10853-018-2946-4 [retrieved on Sep. 25, 2018].

Lisha Wang et al., "The Burial of Biogenic Silica, Organic Carbon and Organic Nitrogen in the Sediments of the East China Sea," J. Ocean Univ. China (Oceanic and Coastal Sea Research) 2015, vol. 14, No. 3, pp. 464-470, Springer.

Luca Aldega et al., "Detrital Illite Crystals Identified from Crystallite Thickness Measurements in Siliciclastic Sediments," American Mineralogist, 2005, vol. 90, pp. 1587-1596.

M. E. Awad et al., "Crystallite size as a function of kaolinite structural order-disorder and kaolin chemical variability: Sedimentological implication", Applied Clay Science 162 (2018) pp. 261-267. (Year: 2018).

Mohsen Abdul et al: "Horizontal Well Correlation Using Real Time Data and Log Prediction in Geosteering Complex Reservoirs of Saudi Arabia", Mar. 13, 2013 (Mar. 13, 2013), XP093247978.

Ou Chenghua et al.; "Fine reservoir structure modeling based upon 3D visualized stratigraphic correlation between horizontal wells: methodology and its application," Journal Of Geophysics And Engineering, vol. 14, No. 6, Nov. 22, 2017, pp. 1557-1571.

PCT International Search Report and Written Opinion, mailed on Dec. 9, 2020, issued in International Application No. PCT/US2020/040548, filed on Jul. 1, 2020, 123pages.

PCT International Search Report and Written Opinion, mailed on Mar. 10, 2021, issued in International Application No. PCT/US2020/040533, filed on Jul. 1, 2020, 13 pages.

PCT International Search Report and Written Opinion, mailed on Oct. 21, 2020, issued in International Application No. PCT/US2020/040539, filed on Jul. 1, 2020, 13 pages.

PCT International Search Report and Written Opinion, mailed on Sep. 28, 2020, issued in International Application No. PCT/US2020/040552, filed on Jul. 1, 2020, 11 pages.

Ramer et al., Attenuated Total Reflection Fourier Transform Infrared Spectroscopy, Mar. 15, 2013, Infrared Spectroscopy, pp. 1-27. (Year: 2013).

Randy Blood, et al., "Biogenic Silica in the Devonian Shale Succession of the Appalachian Basin, USA," AAPG Search and Discovery Article #50864, Sep. 23, 2013, 30 pgs.

Ratcliffe et al., Unconventional Methods For Unconventional Plays: Using Elemental Data To Understand Shale Resource Plays, Part 2, PESA News Resources, Apr./May 2012.

Ratcliffe Ken et al: "Unconventional Methods For Unconventional Plays: Using Elemental Data to Understand Shale Resource Plays, Part 1", PESA News Resources, Feb./Mar. 2012, Feb. 1, 2012 (Feb. 1, 2012), pp. 89-93, XP093122411, Retrieved from the Internet: URL:https://www.chemostrat.com/wp-content/uploads/2013/08/Shale—Exploration-Part-1.pdf [retrieved on Jan. 22, 2024].

Sadaf Nazneen et al., "Distribution and Sources of Carbon, Nitrogen, Phosphorus and Biogenic Silica in the Sediments of Chilika Lagoo," J. Earth Syst. Sci., 2017, vol. 126, 13 pgs., Indian Academy of Sciences.

Utpalendu Kuila et al., "Total Porosity Measurement in Gas Shales by the Water Immersion Porosimetry (WIP) Method," Fuel 117, 2014, pp. 1115-1129, Elsevier.

Vit Jelinek , V . , "Characterization of the magnetic fabric of rocks" 1981. Characterization of the magnetic fabric of rocks. Tectonophysics, 79: pp. T63-T67. (Year: 1981).

Wyllie, M.R.J., et al., "Elastic wave velocities in heterogeneous and porous media," Geophysics, Jan. 1956, vol. 21, p. 41-70.

* cited by examiner

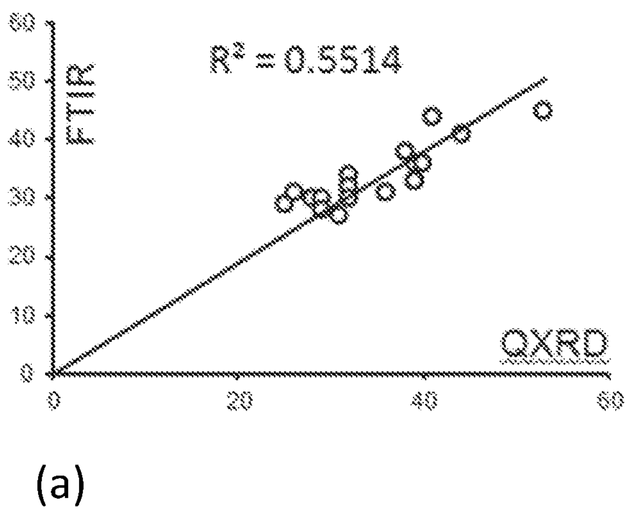
(a)
Fig. 10
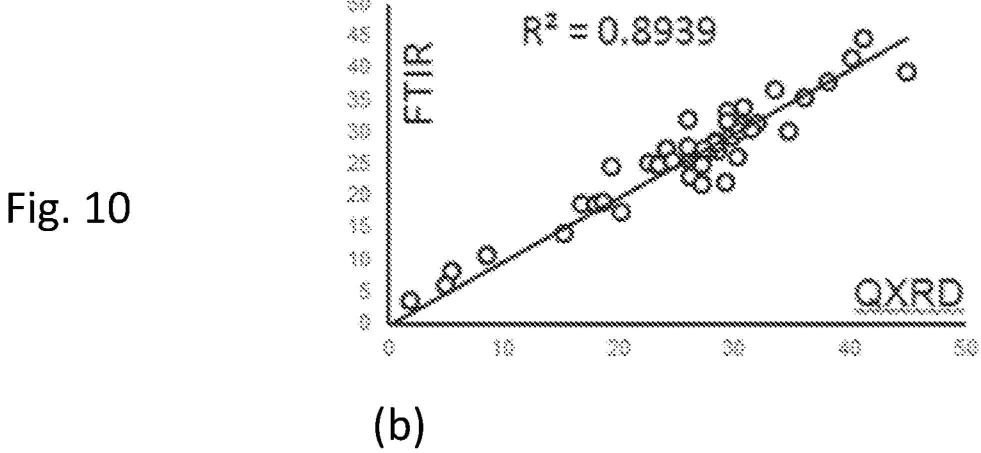
(b)
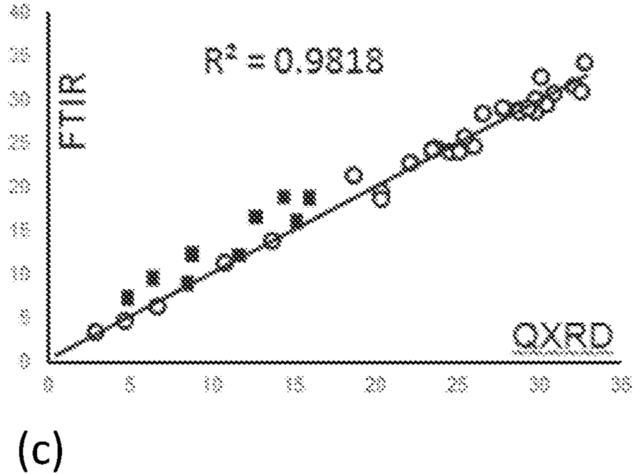
(c)

SPECTROSCOPIC ANALYSIS OF ROCKS

FIELD

The present disclosure concerns methods of identifying and quantifying constituent phases in rock samples based on spectroscopic measurements, methods of determining values of pyrolysis parameters for rock samples based on spectroscopic measurements, and methods of determining amounts of organic phases in rock samples based on spectroscopic measurements, as well as associated computer programs, computer-readable media, data carrier signals and data sets, and methods of compiling associated data sets for use in such methods.

BACKGROUND

Rocks are naturally-occurring composite materials which typically include multiple different mineral or mineraloid phases, as well as organic matter (such as hydrocarbons in gaseous, liquid and/or solid form) and water. For example, shale rock typically comprises a plurality of layered clay (i.e. silicate) mineral sheets held together by a chemically and structurally distinct mineral matrix, as well as free hydrocarbons and deposits of kerogen, bitumen and pyrobitumen.

The physico-chemical properties of rocks depend on the rock composition. Compositional analysis of rock samples is therefore important in the field of geology, and is of particular importance in hydrocarbon exploration. This is because the composition of a rock sample provides information relating to the history of the rock across geological timescales (for example, providing information regarding the circumstances under which sediment was deposited or regarding the diagenetic or metamorphic processes which the sediment or rock has subsequently undergone). Information gained from the compositional analysis of rock samples can be used to identify the likely location of subterranean hydrocarbon deposits and to determine the properties (for example, mechanical properties) of subterranean rocks which can be used, for example, in the development and interpretation of seismic models and in the calculation of rock strength, and therefore in the calculation of the pressure environments required to fracture rock (e.g. by hydraulic fracturing) or to maintain rock fractures (whether man-made or naturally occurring). Results obtained from the compositional analysis of rock samples can also be used to develop stratigraphic and depositional models of a region.

The mineralogical composition of rocks extracted from hydrocarbon wells can be determined precisely in the laboratory, for example using methods such as quantitative X-ray diffraction (QXRD). The presence of organic phases can also be determined using total organic carbon (TOC) combustion (e.g. using a LECO combustion instrument) and/or pyrolysis (e.g. using a Rock-Eval pyrolysis instrument) analysis methods. However, such analytical methods are typically time-consuming and require the use of high-quality core samples.

Improved methods for analysing the composition of rocks would therefore be of benefit.

SUMMARY OF INVENTION

According to a first aspect, a method comprises identifying (e.g. the presence of) a constituent phase in a rock sample based on a spectroscopic measurement obtained from the rock sample (e.g. using a spectroscopic method).

It may be that the spectroscopic measurement is obtained from the rock sample by infra-red spectroscopy (i.e. an infra-red spectroscopic method). It may be that the spectroscopic measurement is obtained from the rock sample by Fourier Transform Infra-red (FTIR) spectroscopy (i.e. an FTIR spectroscopic method).

It may be that the method comprises determining (e.g. estimating or calculating) an amount of the constituent phase in the rock sample based on the spectroscopic measurement obtained from the rock sample.

It may be that the method comprises identifying (e.g. the presence of) two or more (i.e. different) constituent phases in the rock sample based on the spectroscopic measurement.

It may be that the method comprises determining (e.g. estimating or calculating) a respective amount of two or more (i.e. different) constituent phases in the rock sample based on the spectroscopic measurement obtained from the rock sample.

It may be that the amount of a constituent phase in the rock sample is a parameter indicative of a volume (e.g. total volume) of the said constituent phase in the rock sample. The parameter indicative of a volume (e.g. total volume) of the said constituent phase in the rock sample may be a volume (e.g. total volume) of the said constituent phase in the rock sample. Alternatively, the parameter indicative of a volume of the said constituent phase in the rock sample may be a volume fraction of the said constituent phase in the rock sample (e.g. the fraction of the total volume of the rock sample constituted by the said constituent phase).

Alternatively, it may be that the amount of a constituent phase in the rock sample is a parameter indicative of a mass (e.g. total mass) of the said constituent phase in the rock sample. The parameter indicative of a mass (e.g. total mass) of the said constituent phase in the rock sample may be a mass (e.g. total mass) of the said constituent phase in the rock sample. Alternatively, the parameter indicative of a mass of the said constituent phase in the rock sample may be a mass fraction of the said constituent phase in the rock sample (e.g. the fraction of the total mass of the rock sample constituted by the said constituent phase).

It will be appreciated that, in embodiments in which the method comprises determining an amount of two or more constituent phases in the rock sample, the amount of one or more first constituent phases in the rock sample may be quantified in terms of one or more parameters indicative of the volume (e.g. the total volume or the volume fraction) of the said one or more first constituent phases in the rock sample and the amount of one or more second constituent phases in the rock sample may be quantified in terms of one or more parameters indicative of the mass (e.g. the total mass or the mass fraction) of the said one or more second constituent phases in the rock sample.

It may be that determining the amount of the or each constituent phase in the rock sample comprises: obtaining the spectroscopic measurement from the rock sample; and determining the amount of the or each constituent phase in the rock sample based on the spectroscopic measurement and a spectroscopic calibration model which defines a relationship between spectroscopic measurements and constituent phase amounts for rock samples.

The spectroscopic measurement may comprise (e.g. be) a value of a spectroscopic parameter (for example, an emission or absorption signal (e.g. intensity) at a particular wavelength) or a plurality of values of a spectroscopic parameter (for example, emission or absorption signals (e.g.

intensities) at a plurality of different wavelengths), e.g. a spectroscopic (emission or absorption) spectrum.

The spectroscopic calibration model may define a mathematical relationship (e.g. a functional relationship or mapping) between the spectroscopic measurements and the constituent phase amounts for rock samples. The spectroscopic calibration model may therefore be (or be represented by) a mathematical function. The mathematical function may be expressed (or expressible) in an analytical or a numerical form. The mathematical function may be parameterised based on (i.e. in terms of) spectroscopic calibration model parametrisation data, for example as stored in a look-up table.

It may be that at least one constituent phase (e.g. the or each constituent phase) is a solid constituent phase. Alternatively, it may be that one or more constituent phases are fluid (e.g. liquid and/or gas) constituent phases.

Each constituent phase may be a mineralogical phase (for example, a mineral phase or a mineraloid phase) or an organic phase (e.g. a fluid (e.g. liquid and/or gas) organic phase (such as a free (i.e. moveable) hydrocarbon phase) or a solid or substantially solid (i.e. semi-solid) organic phase such as kerogen, bitumen or pyrobitumen). Each constituent phase may be a single material (e.g. a single mineral or mineraloid) or a composite comprising two or more materials (e.g. a composite comprising two or more minerals and/or mineraloids).

Example minerals include quartz, feldspar, calcite, dolomite, pyrite and clay minerals (such as kaolinite, illite and montmorillonite). Example mineraloids include opal and obsidian. Example organic phases include free (i.e. moveable) hydrocarbons, kerogen, bitumen and pyrobitumen.

An example composite phase is a mineral matrix phase comprising two or more minerals and/or mineraloids. A further example composite phase is a total organic carbon (TOC) phase comprising all sources of organic carbon (e.g. free (i.e. moveable) hydrocarbons, kerogen, bitumen and pyrobitumen, where present, i.e. in contrast to sources of inorganic carbon such as carbonates) in the rock sample.

Accordingly, the method may comprise identifying (e.g. determining the amount of) one or more (e.g. two or more) mineralogical (i.e. mineral and/or mineraloid) phases in the rock sample. Additionally or alternatively, the method may comprise identifying (e.g. determining the amount of) one or more (e.g. two or more) organic phases in the rock sample. For example, the method may comprise identifying (e.g. determining the amount of) total organic carbon (TOC) in the rock sample. For the avoidance of doubt, the method may comprise identifying (e.g. determining the respective amount of) one or more mineralogical phases and one or more organic phases (e.g. total organic carbon (TOC)) in the rock sample.

It may be the determining the amount of a constituent phase in the rock sample comprises determining (e.g. estimating) the value of a pyrolysis parameter associated with a constituent phase (e.g. an organic phase) in the rock sample (i.e. determining (e.g. estimating) the value of the pyrolysis parameter for the rock sample). For example, the method may comprise determining (e.g. estimating) the value of a (e.g. Rock-Eval) pyrolysis parameter associated with a constituent phase (e.g. an organic phase) in the rock sample (i.e. determining (e.g. estimating) the value of the (e.g. Rock-Eval) pyrolysis parameter for the rock sample). The pyrolysis parameter (e.g. Rock-Eval pyrolysis parameter) may be indicative of the amount of free hydrocarbons (i.e. gas and oil) in the rock sample. For example, the pyrolysis parameter may be the (e.g. Rock-Eval) S1 pyrolysis parameter (it being understood that the (e.g. Rock-Eval) S1 pyrolysis parameter is associated with (e.g. is the height of) the S1 peak in a (e.g. Rock-Eval) pyrolysis spectrum associated with pyrolysis of free hydrocarbons). Alternatively, the pyrolysis parameter (e.g. Rock-Eval pyrolysis parameter) may be indicative of the amount of hydrocarbons released from the rock sample during thermal pyrolysis (i.e. thermal cracking of non-volatile organic matter). For example, the pyrolysis parameter may the (e.g. Rock-Eval) S2 pyrolysis parameter (it being understood that the (e.g. Rock-Eval) S2 pyrolysis parameter is associated with (e.g. is the height of) the S2 peak in a (e.g. Rock-Eval) pyrolysis spectrum associated with thermal pyrolysis). Accordingly, the method may comprise determining, based on the spectroscopic measurement obtained from the rock sample: the amount of one or more mineralogical phases in the rock sample; the amount of one or more organic phases (e.g. total organic carbon (TOC)) in the rock sample; and the value of a (e.g. Rock-Eval) pyrolysis parameter (e.g. the (e.g. Rock-Eval) S1 pyrolysis parameter or the (e.g. Rock-Eval) S2 pyrolysis parameter) for the rock sample.

The rock sample may be a core sample. The skilled person will appreciate that a core sample is a cylindrical section of rock having standardised dimensions. For example, a core sample may be a cylindrical section of rock having a diameter of about 1 inch. Plugs may be extracted from core samples for detailed analysis.

Alternatively, the rock sample may be a cuttings sample. The skilled person will appreciate that a cuttings sample is a sample of drill cuttings obtained when a well is drilled. Drill cuttings typically comprise (e.g. consist of) relatively small, broken pieces of rock produced by drilling action and brought to the surface in drilling mud. Cuttings samples are commonly examined as part of mud logging (i.e. well logging) processes.

It may be that one or more steps of the method are carried out by a computer. For example, it may be that the method comprises the computer identifying the or each constituent phase in the rock sample based on the spectroscopic measurement. It may be that the method comprises the computer determining the amount of the or each constituent phase in the rock sample based on the spectroscopic measurement.

In a second aspect, a computer program comprises instructions which, when the program is executed by a computer, cause the computer to carry out one or more steps of the method according to the first aspect. For example, it may be that the instructions, when the program is executed by the computer, cause the computer to carry out any combination of the steps of the method of the first aspect identified hereinabove as being carried out by (or being suitable for being carried out by) a computer.

In a third aspect, there is provided a (e.g. non-transitory) computer-readable medium storing the computer program (e.g. the instructions) according to the second aspect. The computer program (e.g. the instructions) may be stored as computer-executable program code.

In a fourth aspect, there is provided a data carrier signal carrying (e.g. encoding) the computer program (e.g. the instructions) according to the second aspect. The computer program (e.g. the instructions) may be provided in the form of computer-executable program code.

In a fifth aspect, a method comprises: fitting a spectroscopic calibration model to spectroscopic measurement data and corresponding constituent phase compositional measurement data obtained from a plurality of (i.e. different) reference rock samples, wherein the constituent phase compositional measurement data obtained from a reference rock sample is indicative of an amount of one or more constituent phases in the reference rock sample, and wherein the spectroscopic calibration model defines a relationship (e.g. a mathematical or functional relationship, e.g. a mapping) between the spectroscopic measurement data and the corresponding constituent phase compositional measurement data for the plurality of (i.e. different) reference rock samples.

Accordingly, it may be that the method comprises: providing the spectroscopic measurement data obtained from the plurality of (i.e. different) reference rock samples; and providing the corresponding constituent phase compositional measurement data obtained from the (i.e. same) plurality of (i.e. different) reference rock samples. The method may further comprise obtaining the spectroscopic measurement data from the plurality of (i.e. different) reference rock samples (i.e. using a spectroscopic method); and obtaining the corresponding constituent phase compositional measurement data obtained from the (i.e. same) plurality of (i.e. different) reference rock samples (i.e. using a spectroscopic method).

The spectroscopic measurement data may be infra-red spectroscopic measurement data. For example, the spectroscopic measurement data may be Fourier Transform Infrared (FTIR) spectroscopic measurement data.

The constituent phase compositional measurement data may be obtained by measuring an amount of one or more constituent phases in the or each reference rock sample.

The constituent phase compositional measurement data obtained from the reference rock samples may comprise mineralogical phase compositional measurement data comprising measurements of an amount of one or more mineralogical (e.g. mineral and/or mineraloid) phases in the reference rock samples. The amount of one or more mineralogical phases in a reference rock sample may be measured using a mineralogical analysis method such as X-ray diffraction (XRD), for example quantitative X-ray diffraction (QXRD). Accordingly, the measurements of the amount of one or more mineralogical phases in a reference rock sample may comprise (e.g. be) XRD (e.g. QXRD) measurements of the amount of one or more mineralogical phases in the reference rock sample.

Additionally or alternatively, the constituent phase compositional measurement data obtained from the reference rock samples may comprise organic phase compositional measurement data comprising measurements of an amount of one or more organic phases (such as TOC) in the reference rock samples. The amount of one or more organic phases in a reference rock sample may be measured using a combustion analysis method (for example using a combustion analyser such as available from LECO Corporation, Saint Joseph, Michigan, USA). Accordingly, the measurements of the amount of one or more organic phases in a reference rock sample may comprise (e.g. be) combustion analysis measurements (e.g. LECO measurements) of the amount of one or more organic phases (e.g. TOC) in the reference rock sample. Additionally or alternatively, the amount of one or more organic phases in a reference rock sample may be measured using a using a pyrolysis analysis method such as Rock-Eval pyrolysis. For example, a pyrolysis analysis method such as Rock-Eval pyrolysis may be used to determine a value of a pyrolysis parameter (such as a (e.g. Rock-Eval) S1 pyrolysis parameter and/or a (e.g. Rock-Eval) S2 pyrolysis parameter) for the or each reference rock sample. Accordingly, the measurements of the amount of one or more organic phases in a reference rock sample may comprise (e.g. be) pyrolysis analysis measurements (e.g. Rock-Eval pyrolysis measurements) of values of a pyrolysis parameter (such as a (e.g. Rock-Eval) S1 pyrolysis parameter and/or a (e.g. Rock-Eval) S2 pyrolysis parameter) for the reference rock sample.

One or more steps of the method may be carried out by a computer. For example, the method may comprise the computer fitting the spectroscopic calibration model to the spectroscopic measurement data and the corresponding constituent phase compositional measurement data. The spectroscopic calibration model may be fitted to the spectroscopic measurement data and the corresponding constituent phase compositional measurement data using a multivariate statistical method such as a least squares regression method. However, the skilled person will appreciate that any other suitable fitting methods as known in the art may be used. For example, the spectroscopic calibration model may be fitted to the spectroscopic measurement data and the corresponding constituent phase compositional measurement data using a machine learning algorithm (for example, using a neural network or a genetic algorithm) as known in the art.

In a sixth aspect, a computer program comprises instructions which, when the program is executed by a computer, cause the computer to carry out one or more steps of the method according to the fifth aspect. For example, it may be that the instructions, when the program is executed by the computer, cause the computer to carry out any combination of the steps of the method of the fifth aspect identified hereinabove as being carried out by (or being suitable for being carried out by) a computer.

In a seventh aspect, there is provided a data set comprising the spectroscopic measurement data of the fifth aspect and/or the constituent phase compositional measurement data of the fifth aspect and/or spectroscopic calibration model parameter data on which (i.e. in terms of which) the spectroscopic calibration model of the fifth aspect is parametrised.

In an eighth aspect, there is provided a (e.g. non-transitory) computer-readable medium storing the computer program (e.g. the instructions) according to the sixth aspect and/or the data set according to the seventh aspect. The computer program (e.g. the instructions) may be stored as computer-executable program code.

In a ninth aspect, there is provided a data carrier signal carrying (e.g. encoding) the computer program (e.g. the instructions) according to the sixth aspect and/or the data set according to the seventh aspect. The computer program (e.g. the instructions) may be provided in the form of computer-executable program code.

In a tenth aspect, there is provided a method comprising determining (e.g. estimating or calculating) a value of a pyrolysis parameter for a rock sample based on a spectroscopic measurement obtained from the rock sample.

It may be that the spectroscopic measurement is obtained from the rock sample by infra-red spectroscopy (i.e. an infra-red spectroscopic method). It may be that the spectroscopic measurement is obtained from the rock sample by Fourier Transform Infra-red (FTIR) spectroscopy (i.e. an FTIR spectroscopic method).

It may be that determining the value of the pyrolysis parameter for the rock sample comprises: obtaining a spectroscopic measurement from the rock sample; and determining the value of the pyrolysis parameter for the rock sample based on the spectroscopic measurement and a spectroscopic calibration model which defines a relationship between spectroscopic measurements and values of the pyrolysis parameter for rock samples.

The spectroscopic measurement may comprise (e.g. be) a value of a spectroscopic parameter (for example, an emission or absorption signal (e.g. intensity) at a particular wavelength) or a plurality of values of a spectroscopic parameter (for example, emission or absorption signals (e.g. intensities) at a plurality of different wavelengths), e.g. a spectroscopic (emission or absorption) spectrum.

The spectroscopic calibration model may define a mathematical relationship (e.g. a functional relationship or mapping) between the spectroscopic measurements and values of the pyrolysis parameter for rock samples. The spectroscopic calibration model may therefore be (or be represented by) a mathematical function. The mathematical function may be expressed (or expressible) in an analytical or a numerical form. The mathematical function may be parameterised based on (i.e. in terms of) spectroscopic calibration model parametrisation data, for example as stored in a look-up table.

It may be that the pyrolysis parameter is indicative of (e.g. a measure of) the amount of free hydrocarbons in the rock sample. The pyrolysis parameter may be a Rock-Eval pyrolysis parameter. For example, the pyrolysis parameter may be the (e.g. Rock-Eval) S1 pyrolysis parameter (it being understood that the (e.g. Rock-Eval) S1 pyrolysis parameter is associated with (e.g. is the height of) the S1 peak in a (e.g. Rock-Eval) pyrolysis spectrum associated with pyrolysis of free hydrocarbons (i.e. oil and gas)).

Alternatively, it may be that the pyrolysis parameter is indicative of (e.g. a measure of) the amount of hydrocarbons released from the rock sample during thermal pyrolysis. For example, the pyrolysis parameter may the (e.g. Rock-Eval) S2 pyrolysis parameter (it being understood that the (e.g. Rock-Eval) S2 pyrolysis parameter is associated with (e.g. is the height of) the S2 peak in a (e.g. Rock-Eval) pyrolysis spectrum associated with pyrolysis of kerogen and the thermal cracking of non-volatile organic matter).

The rock sample may be a core sample. The skilled person will appreciate that a core sample is a cylindrical section of rock having standardised dimensions. For example, a core sample may be a cylindrical section of rock having a diameter of about 1 inch. Plugs may be extracted from core samples for detailed analysis.

Alternatively, the rock sample may be a cuttings sample. The skilled person will appreciate that a cuttings sample is a sample of drill cuttings obtained when a well is drilled. Drill cuttings typically comprise (e.g. consist of) relatively small, broken pieces of rock produced by drilling action and brought to the surface in drilling mud. Cuttings samples are commonly examined as part of mud logging (i.e. well logging) processes.

It may be that one or more steps of the method are carried out by a computer. For example, it may be that the method comprises the computer determining the value of the pyrolysis parameter for the rock sample based on the spectroscopic measurement obtained from the rock sample.

In an eleventh aspect, there is provided a computer program comprising instructions which, when the program is executed by a computer, cause the computer to carry out one or more steps of the method according to the tenth aspect. For example, it may be that the instructions, when the program is executed by the computer, cause the computer to carry out any combination of the steps of the method of the tenth aspect identified hereinabove as being carried out by (or being suitable for being carried out by) a computer.

In a twelfth aspect, there is provided a (e.g. non-transitory) computer-readable medium storing the computer program (e.g. the instructions) according to the eleventh aspect. The computer program (e.g. the instructions) may be stored as computer-executable program code.

In a thirteenth aspect, a method comprises: fitting a spectroscopic calibration model to spectroscopic measurement data and corresponding pyrolysis parameter measurement data obtained from a plurality of (i.e. different) reference rock samples, wherein the spectroscopic calibration model defines a relationship between the spectroscopic measurement data and the corresponding pyrolysis parameter measurement data for the plurality of reference rock samples.

Accordingly, it may be that the method comprises: providing the spectroscopic measurement data obtained from the plurality of (i.e. different) reference rock samples; and providing the corresponding pyrolysis parameter measurement data obtained from the (i.e. same) plurality of (i.e. different) reference rock samples. The method may further comprise: obtaining the spectroscopic measurement data from the plurality of (i.e. different) reference rock samples (i.e. using a spectroscopic method); and obtaining the corresponding pyrolysis parameter measurement data from the (i.e. same) plurality of (i.e. different) reference rock samples (i.e. using a pyrolysis analysis method).

The spectroscopic measurement data may be infra-red spectroscopic measurement data. For example, the spectroscopic measurement data may be Fourier Transform Infrared (FTIR) spectroscopic measurement data.

The pyrolysis parameter measurement data may be obtained by pyrolysis analysis of the reference rock samples. For example, the pyrolysis measurement data may be obtained by Rock-Eval pyrolysis analysis of the reference rock samples.

Accordingly, the pyrolysis parameter measurement data obtained from the reference rock samples may comprise measurements of values of a pyrolysis parameter (e.g. a pyrolysis parameter associated with the amount of free hydrocarbons in a rock sample or a pyrolysis parameter associated with the amount of kerogen in a rock sample, for example the (e.g. Rock-Eval) S1 pyrolysis parameter or the (e.g. Rock-Eval) S2 pyrolysis parameter) for each reference rock sample.

One or more steps of the method may be carried out by a computer. For example, the method may comprise the computer fitting the spectroscopic calibration model to the spectroscopic measurement data and the corresponding pyrolysis parameter measurement data. The spectroscopic calibration model may be fitted to the spectroscopic measurement data and the corresponding pyrolysis parameter measurement data using a multivariate statistical method such as a least squares regression method. However, the skilled person will appreciate that any other suitable fitting methods as known in the art may be used. For example, the spectroscopic calibration model may be fitted to the spectroscopic measurement data and the corresponding pyrolysis parameter measurement data using a machine learning algorithm (for example, using a neural network or a genetic algorithm) as known in the art.

In a fourteenth aspect, a computer program comprises instructions which, when the program is executed by a computer, cause the computer to carry out one or more steps of the method according to the thirteenth aspect. For example, it may be that the instructions, when the program is executed by the computer, cause the computer to carry out any combination of the steps of the method of the thirteenth aspect identified hereinabove as being carried out by (or being suitable for being carried out by) a computer.

In a fifteenth aspect, there is provided a data set comprising the spectroscopic measurement data of the thirteenth aspect and/or the pyrolysis parameter measurement data of the thirteenth aspect and/or spectroscopic calibration model parameter data on which (i.e. in terms of which) the spectroscopic calibration model of the thirteenth aspect is parametrised.

In a sixteenth aspect, there is provided a (e.g. non-transitory) computer-readable medium storing the computer program (e.g. the instructions) according to the fourteenth aspect and/or the data set according to the fifteenth aspect. The computer program (e.g. the instructions) may be stored as computer-executable program code.

In a seventeenth aspect, there is provided a data carrier signal carrying (e.g. encoding) the computer program (e.g. the instructions) according to the fourteenth aspect and/or the data set according to the fifteenth aspect. The computer program (e.g. the instructions) may be provided in the form of computer-executable program code.

In an eighteenth aspect, there is provided a method comprising determining (e.g. estimating or calculating) an amount of an organic phase in a rock sample based on a spectroscopic measurement obtained from the rock sample.

It may be that the spectroscopic measurement is obtained from the rock sample by infra-red spectroscopy (i.e. an infra-red spectroscopic method). It may be that the spectroscopic measurement is obtained from the rock sample by Fourier Transform Infra-red (FTIR) spectroscopy (i.e. an FTIR spectroscopic method).

It may be that determining the amount of the organic phase in the rock sample comprises: obtaining a spectroscopic measurement from the rock sample; and determining the amount of the organic phase in the rock sample based on the spectroscopic measurement and a spectroscopic calibration model which defines a relationship between spectroscopic measurements and organic phase amounts for rock samples.

The spectroscopic measurement may comprise (e.g. be) a value of a spectroscopic parameter (for example, an emission or absorption signal (e.g. intensity) at a particular wavelength) or a plurality of values of a spectroscopic parameter (for example, emission or absorption signals (e.g. intensities) at a plurality of different wavelengths), e.g. a spectroscopic (emission or absorption) spectrum.

The spectroscopic calibration model may define a mathematical relationship (e.g. a functional relationship or mapping) between the spectroscopic measurements and organic phase amounts for rock samples. The spectroscopic calibration model may therefore be (or be represented by) a mathematical function. The mathematical function may be expressed (or expressible) in an analytical or a numerical form. The mathematical function may be parameterised based on (i.e. in terms of) spectroscopic calibration model parametrisation data, for example as stored in a look-up table.

The amount of the organic phase in the rock sample may be the total amount of an organic phase in the rock sample. For example, the amount of the organic phase in the rock sample may be the amount of total organic carbon (TOC) in the rock sample. It will be appreciated that TOC refers to all sources of organic carbon (e.g. free (i.e. moveable) hydrocarbons, kerogen, bitumen and pyrobitumen, where present, i.e. in contrast to sources of inorganic carbon such as carbonates) in the rock sample.

Accordingly, the method may be a method of determining the amount of OC in the rock sample based on the spectroscopic measurements obtained from the rock sample.

The rock sample may be a core sample. The skilled person will appreciate that a core sample is a cylindrical section of rock having standardised dimensions. For example, a core sample may be a cylindrical section of rock having a diameter of about 1 inch. Plugs may be extracted from core samples for detailed analysis.

Alternatively, the rock sample may be a cuttings sample. The skilled person will appreciate that a cuttings sample is a sample of drill cuttings obtained when a well is drilled. Drill cuttings typically comprise (e.g. consist of) relatively small, broken pieces of rock produced by drilling action and brought to the surface in drilling mud. Cuttings samples are commonly examined as part of mud logging (i.e. well logging) processes.

It may be that one or more steps of the method are carried out by a computer. For example, it may be that the method comprises the computer determining the amount of the organic phase in the rock sample based on the spectroscopic measurement obtained from the rock sample.

In a nineteenth aspect, there is provided a computer program comprising instructions which, when the program is executed by a computer, cause the computer to carry out one or more steps of the method according to the eighteenth aspect. For example, it may be that the instructions, when the program is executed by the computer, cause the computer to carry out any combination of the steps of the method of the eighteenth aspect identified hereinabove as being carried out by (or being suitable for being carried out by) a computer.

In a twentieth aspect, there is provided a (e.g. non-transitory) computer-readable medium storing the computer program (e.g. the instructions) according to the nineteenth aspect. The computer program (e.g. the instructions) may be stored as computer-executable program code.

In a twenty-first aspect, a method comprises: fitting a spectroscopic calibration model to spectroscopic measurement data and corresponding organic phase compositional measurement data obtained from a plurality of (i.e. different) reference rock samples, wherein the spectroscopic calibration model defines a relationship between the spectroscopic measurement data and the corresponding organic phase compositional measurement data for the plurality of reference rock samples.

Accordingly, it may be that the method comprises: providing the spectroscopic measurement data obtained from the plurality of (i.e. different) reference rock samples; and providing the corresponding organic phase compositional measurement data obtained from the (i.e. same) plurality of (i.e. different) reference rock samples. The method may further comprise: obtaining the spectroscopic measurement data from the plurality of (i.e. different) reference rock samples (i.e. using a spectroscopic method); and obtaining the corresponding organic phase compositional measurement data from the (i.e. same) plurality of (i.e. different) reference rock samples (e.g. using a combustion analysis method).

The spectroscopic measurement data may be infra-red spectroscopic measurement data. For example, the spectroscopic measurement data may be Fourier Transform Infra-red (FTIR) spectroscopic measurement data.

The organic phase compositional measurement data may be obtained by combustion analysis of the reference rock samples.

Accordingly, the organic phase compositional measurement data obtained from the reference rock samples may comprise measurements of amounts of the organic phase in each reference rock sample, for example combustion analysis measurements of the amount of TOC in each reference rock sample.

One or more steps of the method may be carried out by a computer. For example, the method may comprise the computer fitting the spectroscopic calibration model to the spectroscopic measurement data and the corresponding organic phase compositional measurement data. The spectroscopic calibration model may be fitted to the spectroscopic measurement data and the corresponding organic phase compositional measurement data using a multivariate statistical method such as a least squares regression method. However, the skilled person will appreciate that any other suitable fitting methods as known in the art may be used. For example, the spectroscopic calibration model may be fitted to the spectroscopic measurement data and the corresponding organic phase compositional measurement data using a machine learning algorithm (for example, using a neural network or a genetic algorithm) as known in the art.

In a twenty-second aspect, a computer program comprises instructions which, when the program is executed by a computer, cause the computer to carry out one or more steps of the method according to the twenty-first aspect. For example, it may be that the instructions, when the program is executed by the computer, cause the computer to carry out any combination of the steps of the method of the twenty-first aspect identified hereinabove as being carried out by (or being suitable for being carried out by) a computer.

In a twenty-third aspect, there is provided a data set comprising the spectroscopic measurement data of the twenty-first aspect and/or the organic phase compositional measurement data of the twenty-first aspect and/or spectroscopic calibration model parameter data on which (i.e. in terms of which) the spectroscopic calibration model of the twenty-first aspect is parametrised.

In a twenty-fourth aspect, there is provided a (e.g. non-transitory) computer-readable medium storing the computer program (e.g. the instructions) according to the twenty-second aspect and/or the data set according to the twenty-third aspect. The computer program (e.g. the instructions) may be stored as computer-executable program code.

In a twenty-fifth aspect, there is provided a data carrier signal carrying (e.g. encoding) the computer program (e.g. the instructions) according to the twenty-second aspect and/or the data set according to the twenty-third aspect. The computer program (e.g. the instructions) may be provided in the form of computer-executable program code.

In a twenty-sixth aspect, a method comprises determining a ratio A:B, wherein A is a value of a parameter indicative of an (e.g. total) amount of free hydrocarbons in a rock sample and B is an amount of total organic carbon in the rock sample, wherein both A and B are determined based on a spectroscopic measurement obtained from the rock sample. For example, A may be determined by the method according to the first or tenth aspects and B may be determined according to the first and eighteenth aspects.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

FIGURES

Embodiments will now be described by way of example only, with reference to the Figures, in which:

FIG. 10 shows three plots comparing measurements of a parameter in the same rock samples using QXRD and calibrated FTIR, the number of samples tested increasing from (a) to (c);

Figure 11:
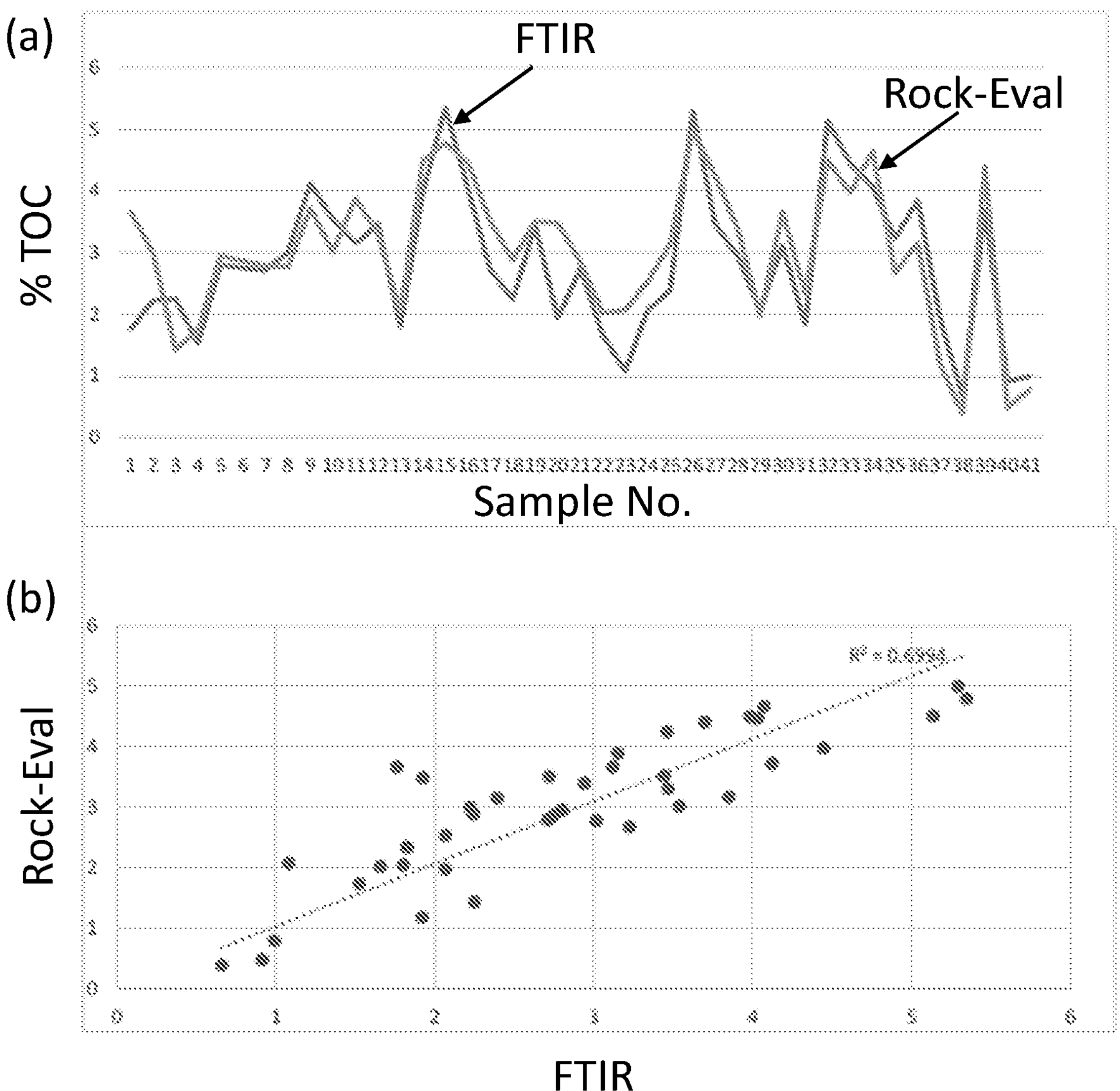
Figure 12:
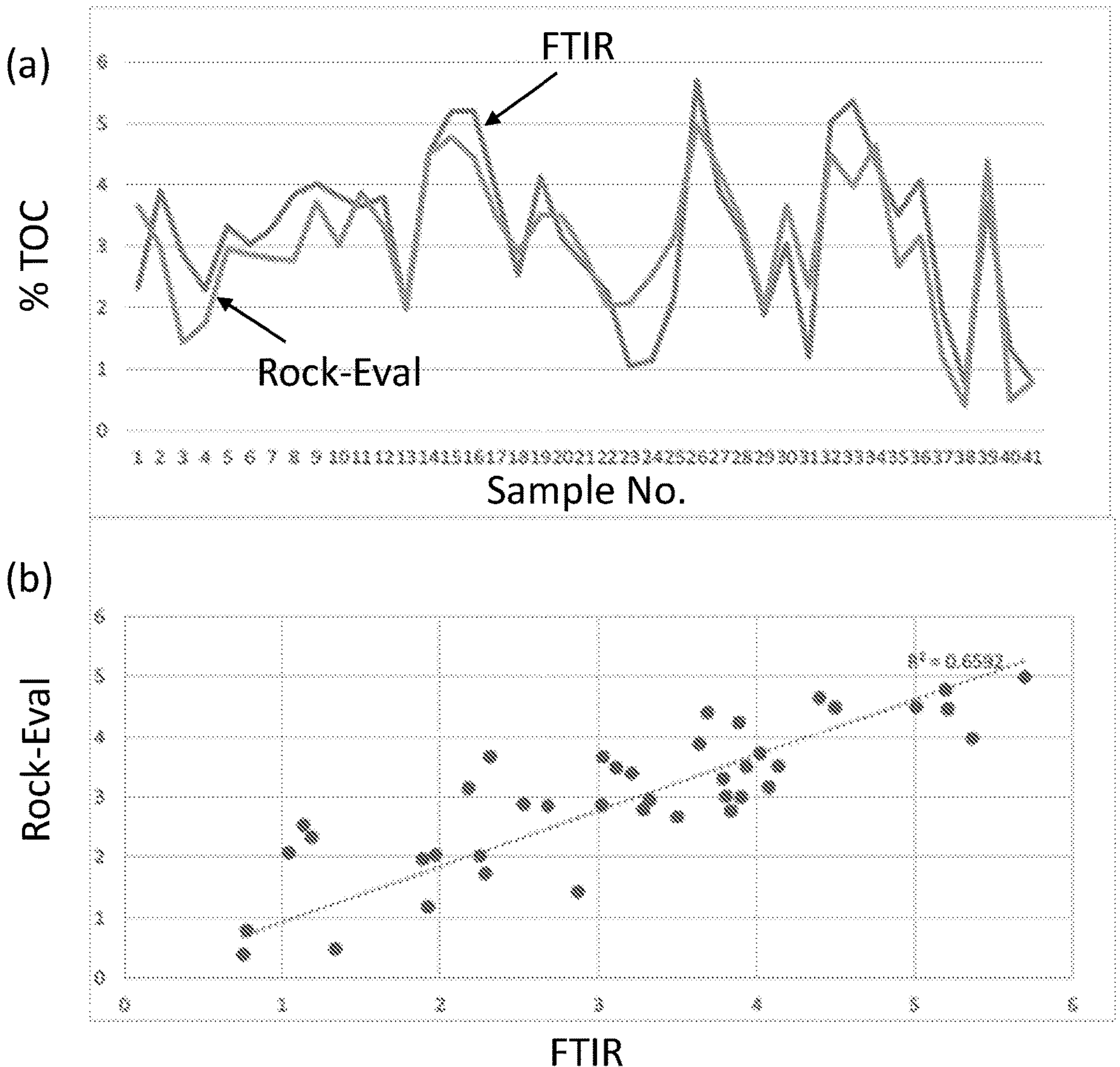
Figure 13:
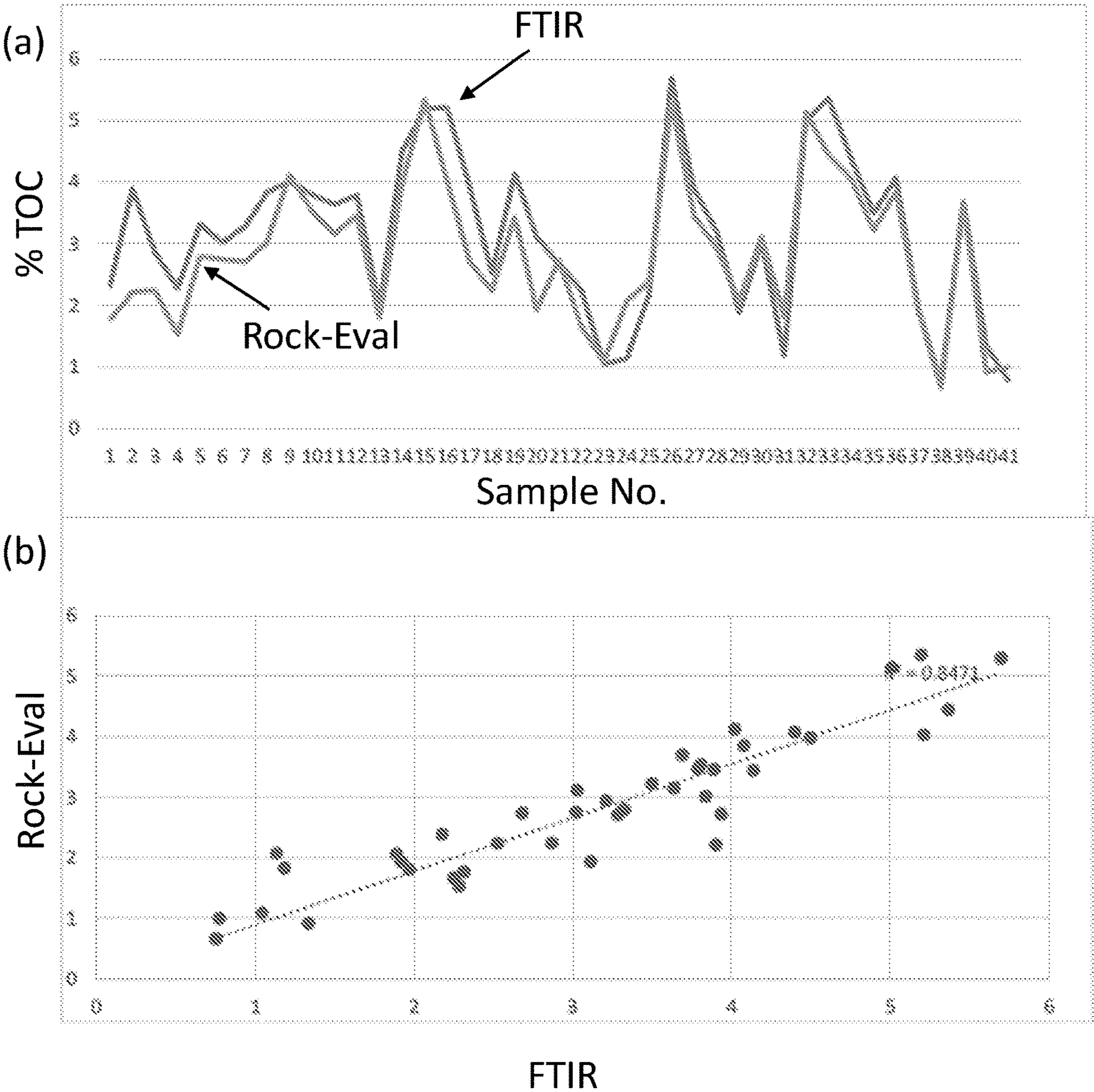
Figure 14:
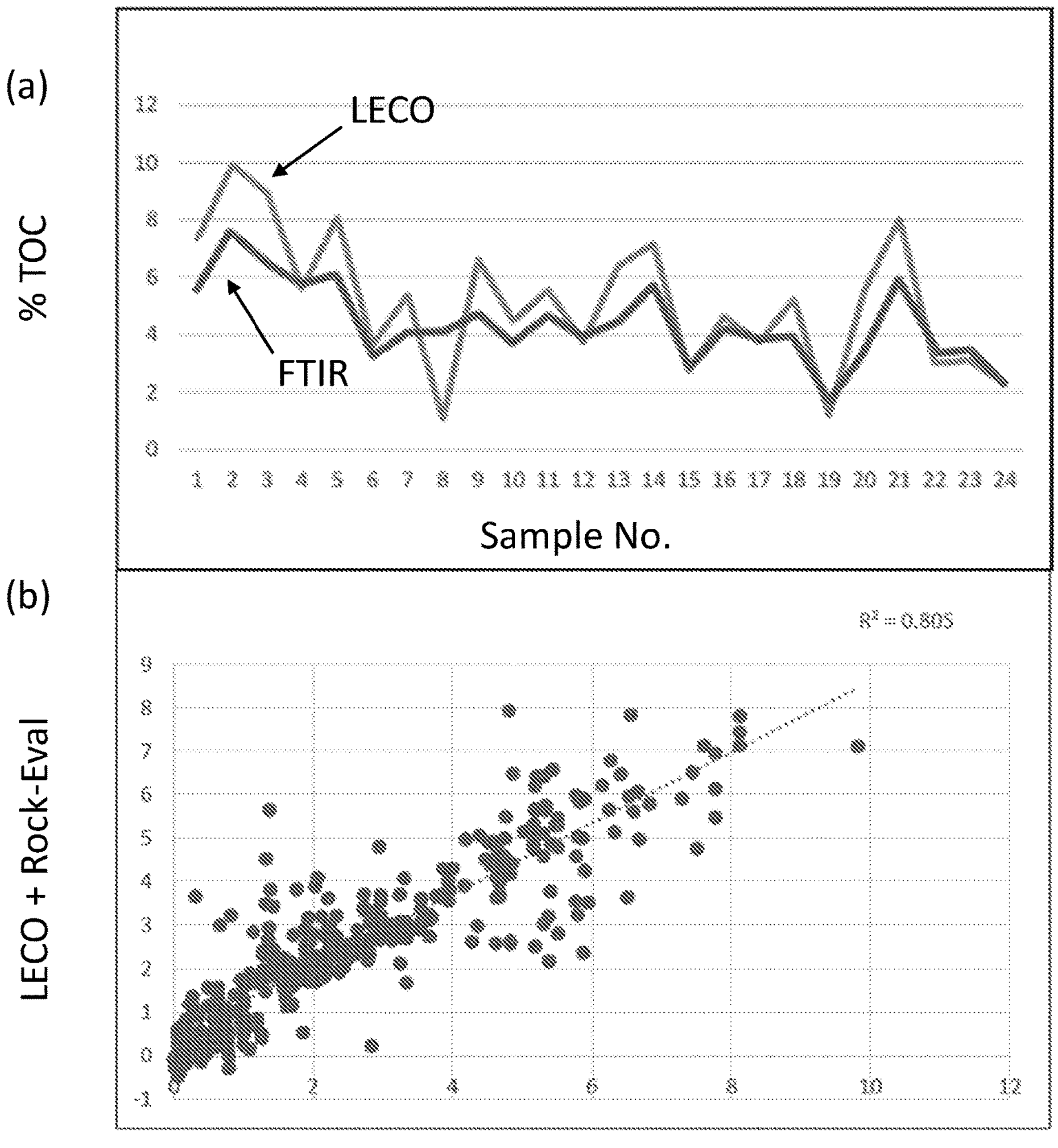
Figure 15:
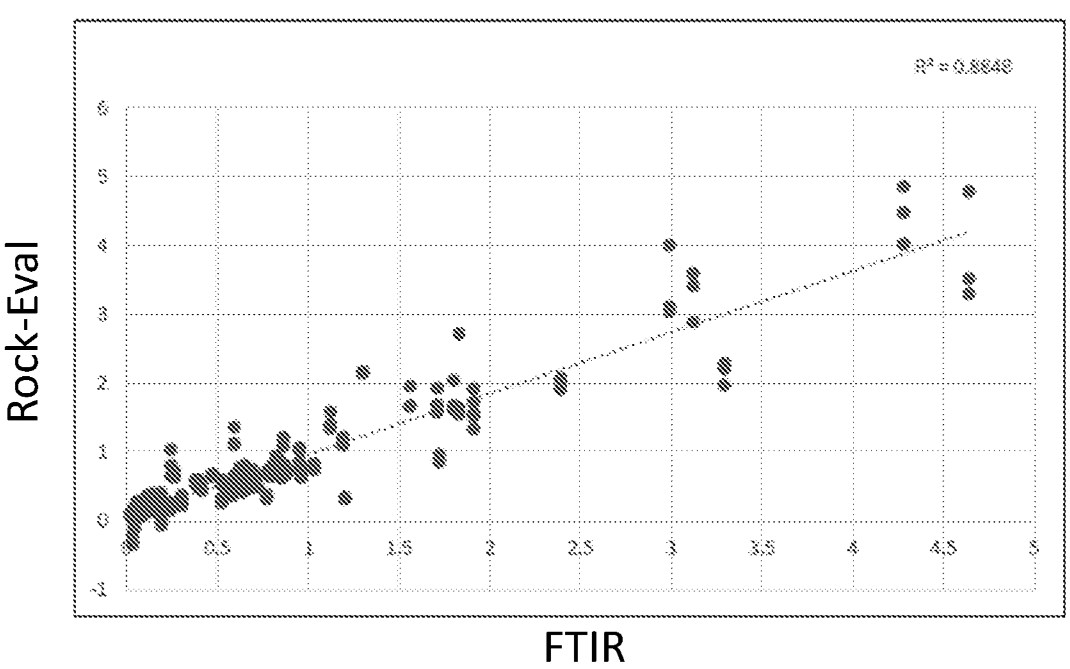
Figure 16:
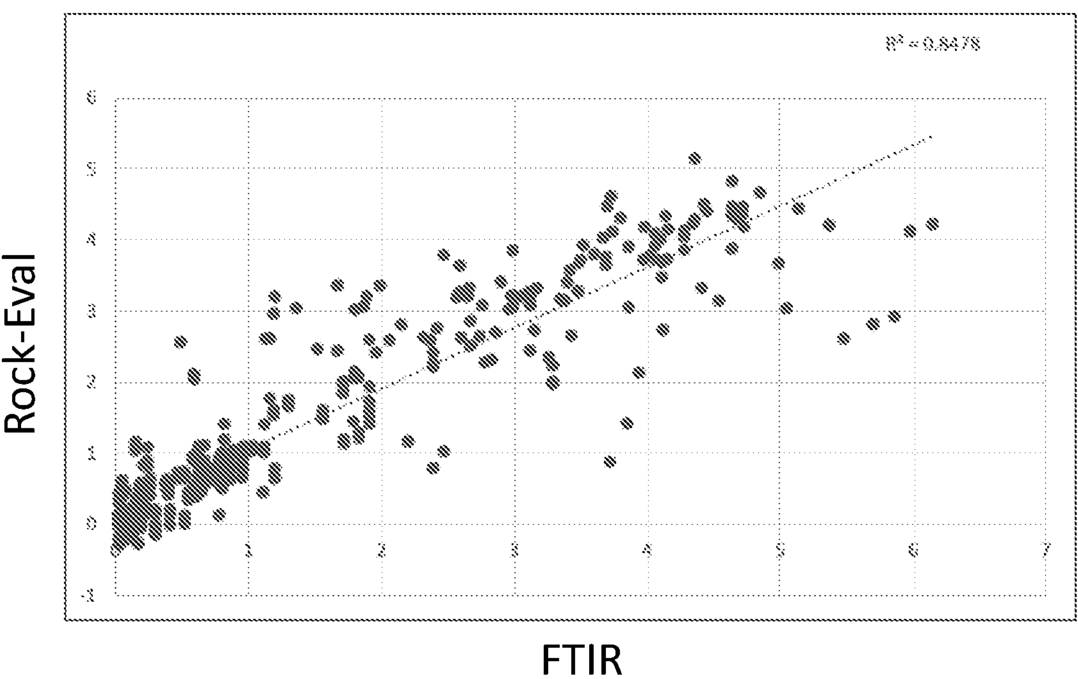
Figure 17:
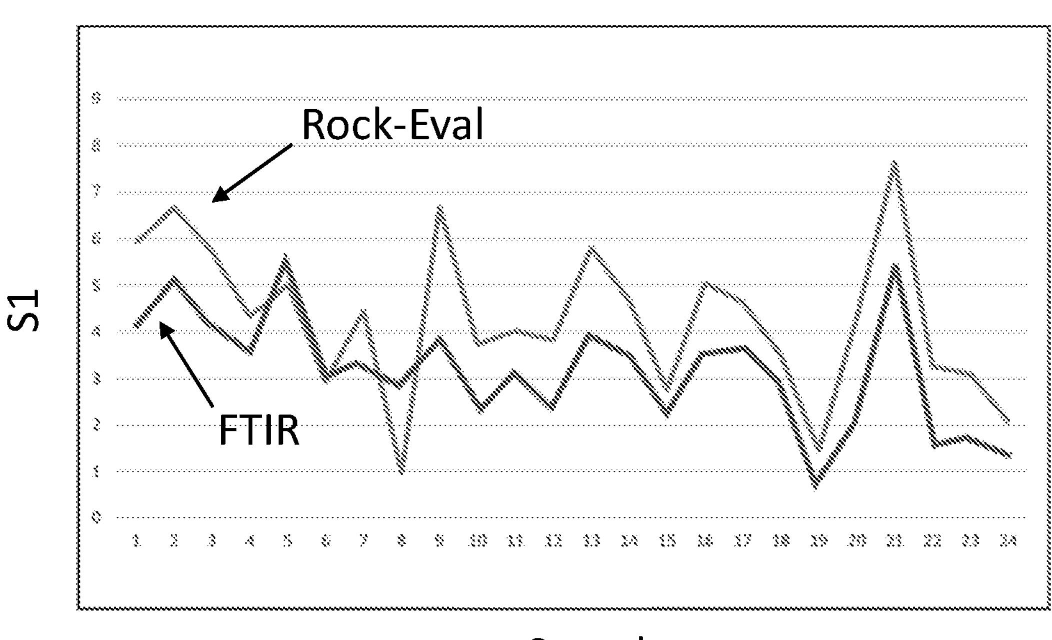
Figure 18:
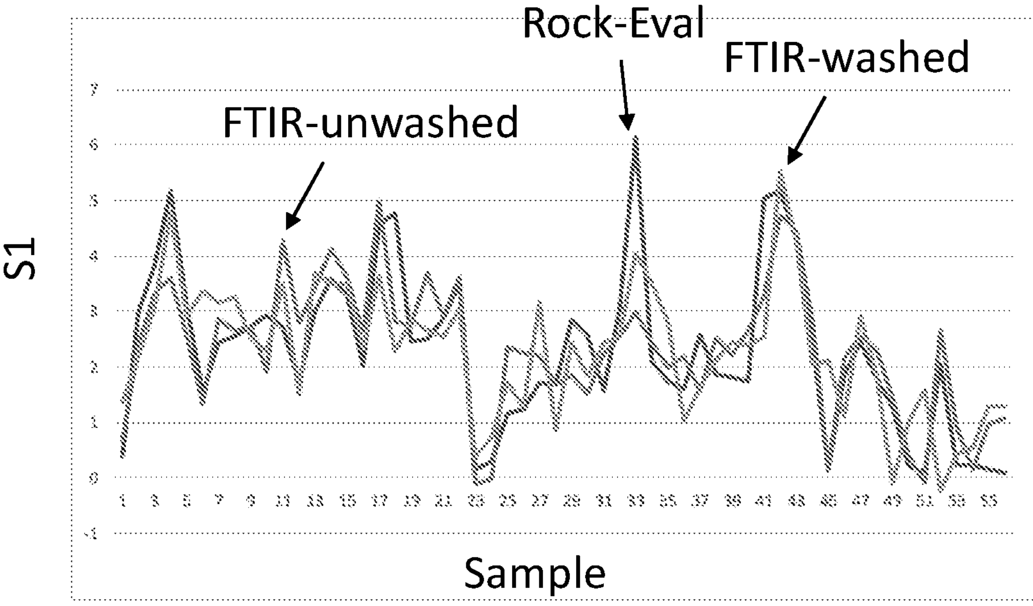
Figure 19:
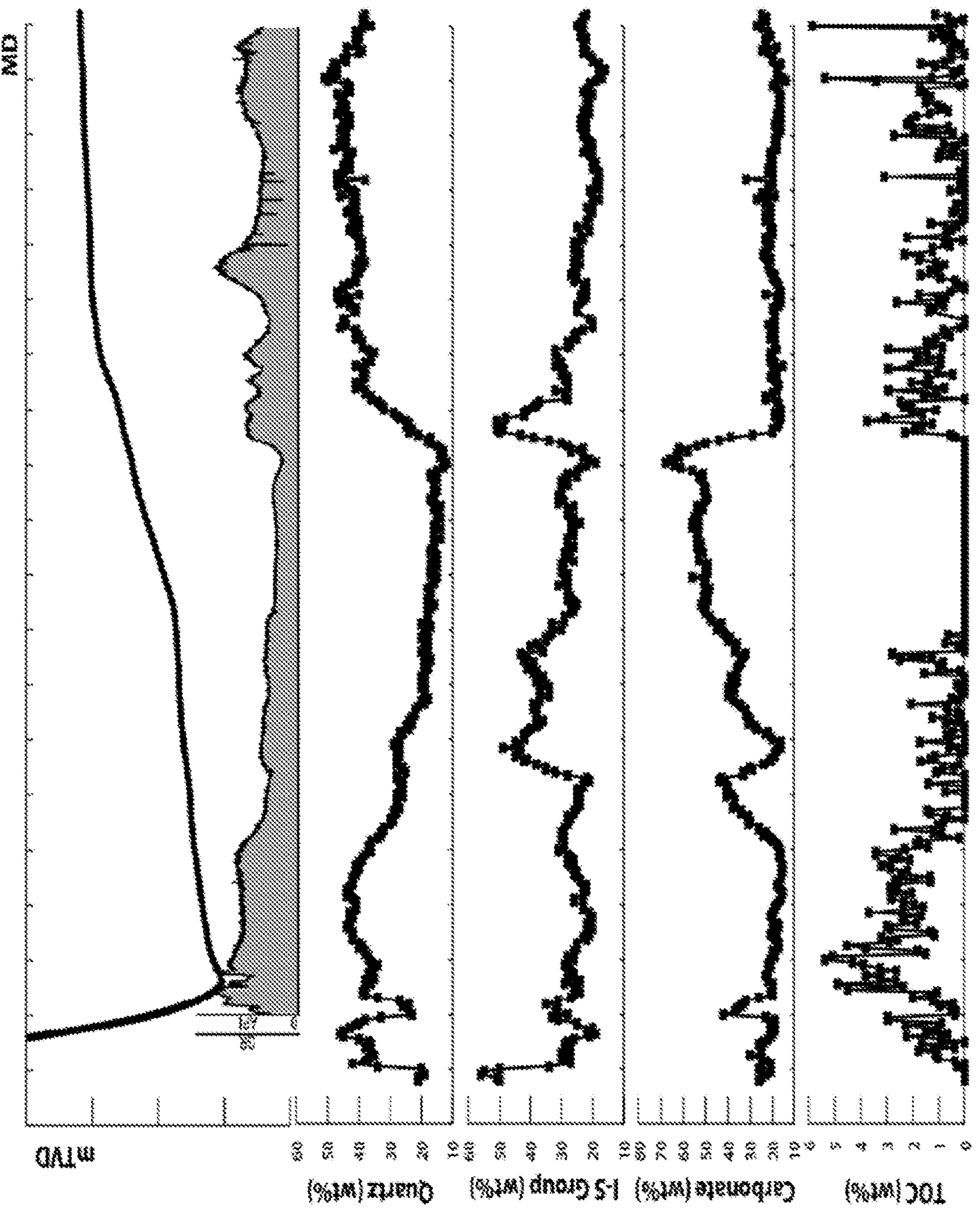
Figure 20:
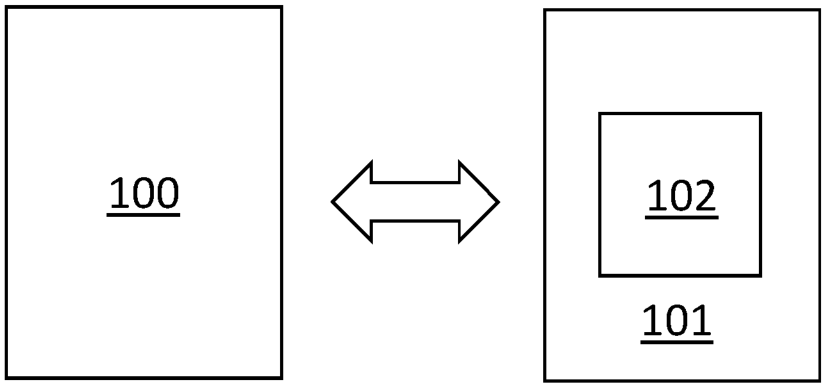

FIG. 11 includes a plot (a) comparing TOC content measured using Rock-Eval pyrolysis and calibrated FTIR for a number of different unwashed core rock samples taken from the Duvernay formation, and a cross plot (b) of the data shown in plot (a);

FIG. 12 includes a plot (a) comparing TOC content measured using Rock-Eval pyrolysis and calibrated FTIR for a number of different core rock samples taken from the Duvernay formation, the rock samples being solvent-washed prior to FTIR analysis, and a cross plot (b) of the data shown in plot (a);

FIG. 13 includes a plot (a) comparing TOC content measured using Rock-Eval pyrolysis and calibrated FTIR for a number of different core rock samples taken from the Duvernay formation, the rock samples being solvent-washed prior to both Rock-Eval and FTIR analysis, and a cross plot (b) of the data shown in plot (a);

FIG. 14 includes a plot (a) comparing TOC content measured using LECO combustion analysis and calibrated FTIR for a number of different core rock samples taken from the Permian Basin, and a cross plot (b) of LECO and Rock-Eval measurements versus calibrated FTIR measurements of the TOC content of a number of different core rock samples taken from the Permian Basin;

FIG. 15 is a cross plot illustrating the agreement between Rock-Eval measurements of the S1 pyrolysis parameter, and the values of S1 predicted using a calibrated FTIR model, for a plurality of core samples from the Permian Basin;

FIG. 16 is a cross plot showing the agreement between Rock-Eval measurements of the S1 pyrolysis parameter, and the values of S1 predicted using a calibrated FTIR model, for a plurality of core samples from the Permian Basin;

FIG. 17 compares values of the S1 pyrolysis parameter measured using Rock-Eval pyrolysis and calibrated FTIR for a plurality of unknown core samples from the Permian Basin;

FIG. 18 compares values of the S1 pyrolysis parameter measured using Rock-Eval pyrolysis and calibrated FTIR for (both solvent-washed and unwashed) unknown core samples from the Duvernay formation;

FIG. 19 is a plot showing (from top to bottom): a lateral well path (in terms of total vertical depth (TVD) and measured depth (MD); a gamma ray log (shaded in grey) measured along the lateral well path; and measurements of rock quartz content, I+S group content, carbonate content and total organic carbon (TOC) content obtained using calibrated FTIR from rock cuttings samples as a function of measured depth (MD) along the well path; and FIG. 20 shows a computer processor in communication with a computer-readable medium storing a computer program comprising computer-executable instructions.

DETAILED DESCRIPTION

Rocks

Rocks are naturally-occurring composite materials. That is to say, rocks are not typically chemically or structurally homogeneous materials, but are instead aggregates of different phases having different chemical compositions and structures. For example, rocks typically include multiple different mineral or mineraloid (i.e. non-crystalline mineral-like substances, such as opal or obsidian) phases, and may also contain organic matter, as well liquids (such as water or hydrocarbons) trapped in pores.

For example, shale rock typically comprises a plurality of layered clay (i.e. silicate) mineral sheets held together by a chemically and structurally distinct mineral matrix. The mineral matrix itself typically comprises a mixture of randomly oriented matrix mineral crystals, such as crystals of quartz, feldspar, calcite, dolomite, pyrite, etc. Shale rock may also include organic material, such as kerogen, bitumen and pyrobitumen, and pores filled with water and/or hydrocarbons.

The compositional analysis of rock samples is an important tool in the field of geology. This is because the composition of a rock sample provides information relating to the history of the rock across geological timescales (for example, providing information regarding the circumstances under which sediment was deposited or regarding the diagenetic or metamorphic processes which the sediment or rock has subsequently undergone). Information gained from the compositional analysis of rock samples is used in hydrocarbon exploration, in particular, to identify the likely location of subterranean hydrocarbon reserves and to determine the properties (for example, mechanical properties) of subterranean rocks which can be used, for example, in the development and interpretation of seismic models and in the calculation of rock strength, and therefore in the calculation of the pressure environments required to fracture rock (e.g. by hydraulic fracturing) or to maintain rock fractures (whether man-made or naturally occurring).

The mineralogical composition of rocks extracted from hydrocarbon wells can be determined precisely in the laboratory, for example using methods such as quantitative X-ray diffraction (QXRD). QXRD can be used to determine the amounts of different phases present in multi-phase samples, as well as the characteristics of single phases, including the precise determination of crystal structure or crystallite size and shape. Quantitative XRD analysis requires the precise and accurate determination of the X-ray diffraction pattern of a sample, both in terms of peaks and intensities. The presence of organic phases in rock samples can also be determined using combustion or pyrolysis analysis methods (e.g. using a LECO instrument for combustion analysis or a Rock-Eval instrument for pyrolysis analysis).

Such analytical methods typically require the use of core samples. A core sample is a cylindrical section of rock having standardised dimensions. It can, however, be difficult and expensive to obtain core samples for compositional analysis. For example, it may not be possible to extract core samples from a sufficient number of different sampling locations along a hydrocarbon well path to obtain an accurate picture of the variation in rock composition along the well. The compositional analysis of core samples using standard laboratory methods such as QXRD can also be also time-consuming.

One alternative to the use of core samples is to carry out the required compositional analysis measurements on cuttings samples. Cuttings samples are samples of the drill cuttings obtained when a well is drilled; drill cuttings are typically small, broken pieces of rock produced by the drilling action and brought to the surface in the drilling mud. Cuttings samples are therefore typically plentiful, as well as easy and inexpensive to obtain. Cuttings are typically examined as part of mud logging (i.e., well logging) analysis, which includes observation of the cuttings, microscopic examination and basic chemical analysis. It is, however, generally understood that cuttings samples are not suitable for detailed compositional analysis, for example by QXRD. Nevertheless, the present inventors have developed methods which can be used to determine the composition of rock cuttings samples.

Calibrated Spectroscopy

In particular, the present inventors have developed a spectroscopic method for determining the phase composition of cuttings samples. While the skilled person will appreciate that the method may be implemented using many different kinds of spectroscopy, the discussion which follows is focused on the particular example of Fourier-transform infra-red spectroscopy (FTIR).

FTIR is a well-known spectroscopic technique for obtaining an infra-red absorption spectrum from a sample, the IR spectrum being reflective of the abundance of particular molecular bonds within the sample. FTIR typically makes use of attenuated total reflection (ATR). The sample (which may be powdered) is held in contact with an optically dense crystal having a high refractive index, and an infra-red beam is directed through the crystal at an angle sufficient to cause total internal reflection within the crystal, thereby generating an evanescent wave which extends beyond the surface of the crystal and into the sample. In regions of the infra-red spectrum where the sample absorbs energy, the evanescent wave will be attenuated or otherwise altered. Attenuated signal from each evanescent wave is passed back into the main infra-red beam which exits the crystal and is detected in the IR spectrometer, thereby generating an infra-red spectrum. For example, FIG. 1 shows an example FTIR spectrum obtained from a rock sample, illustrating the regions of the spectrum associated with infra-red attenuation due to the presence of common mineralogical phases such as clays, quartz and carbonates, as well as a region associated with organic carbon.

Figure 1:
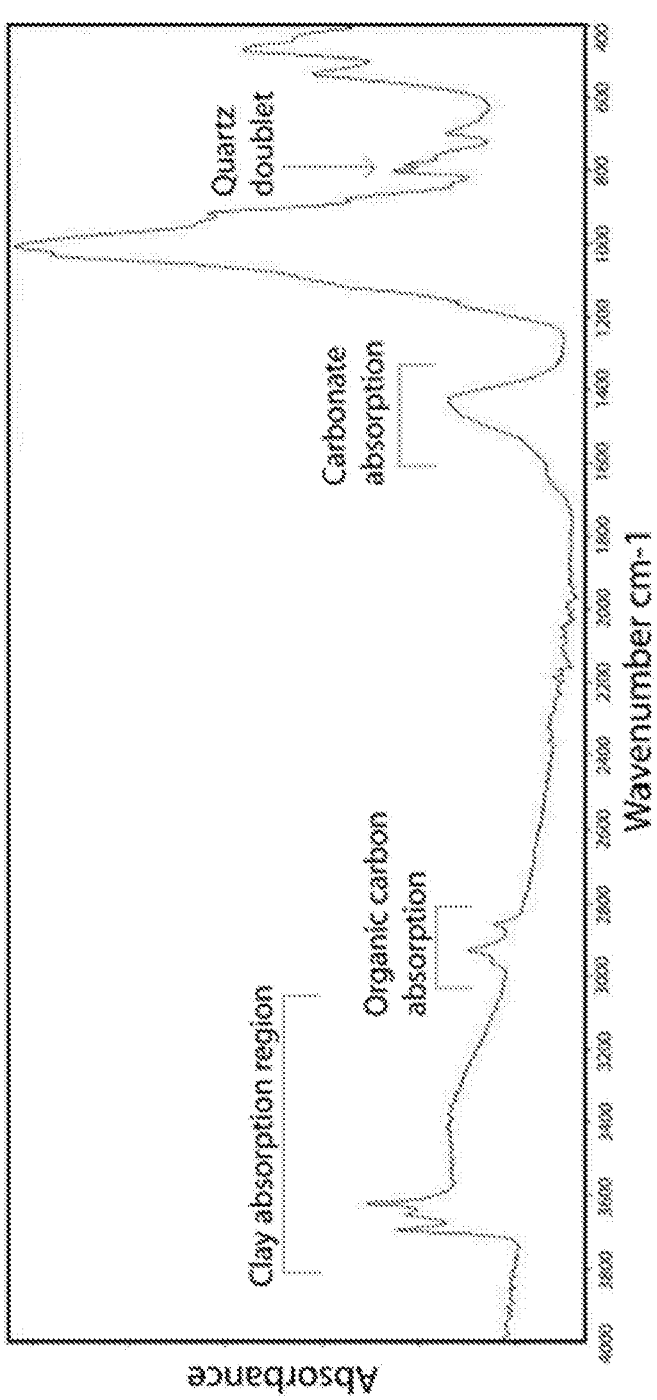
FIG. 1 is an example FTIR absorption spectrum obtained from a rock sample.
Figure 2:
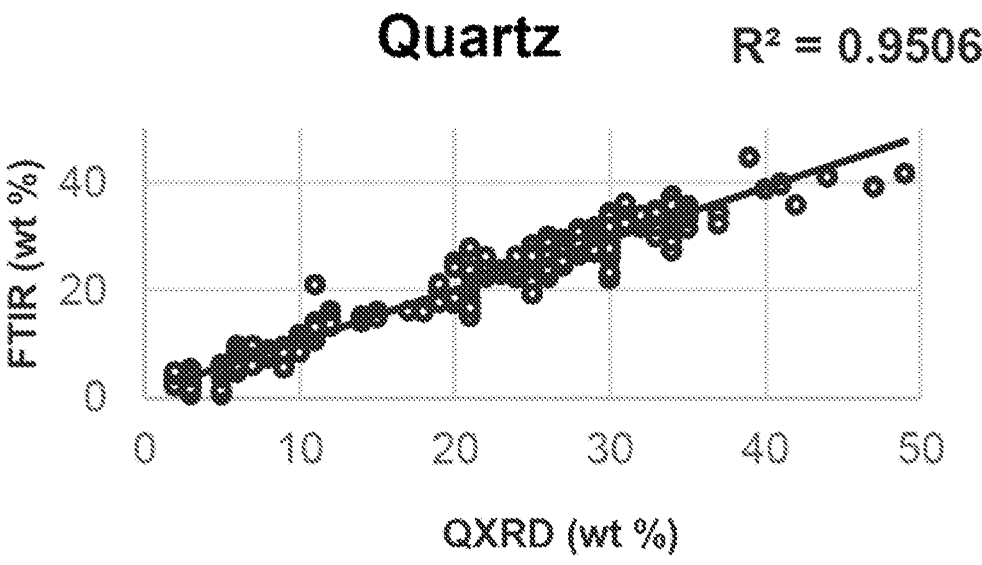
FIG. 2 is a plot comparing measurements of the weight fraction of quartz in the same rock samples using quantitative X-ray diffraction (QXRD) and calibrated Fourier-transform infra-red spectroscopy (FTIR)
Figure 3:
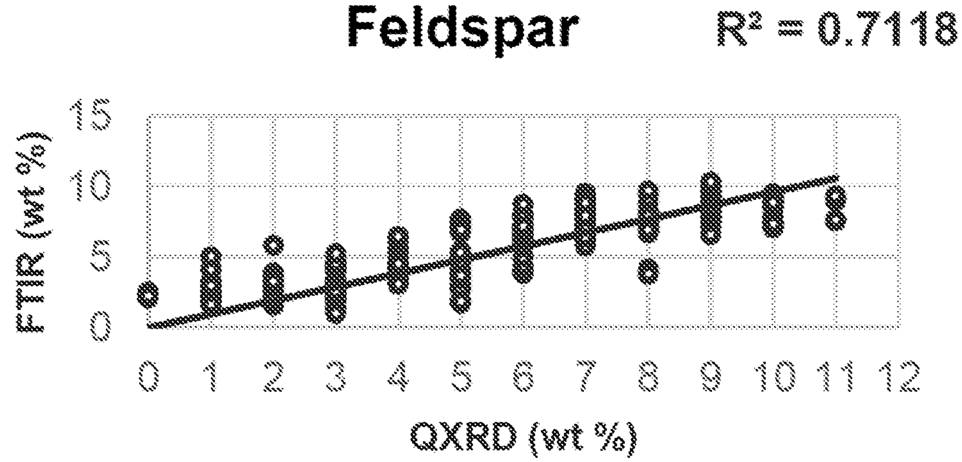
FIG. 3 is a plot comparing measurements of the weight fraction of feldspar in the same rock samples using quantitative X-ray diffraction (QXRD) and calibrated Fourier-transform infra-red spectroscopy (FTIR)
Figure 4:
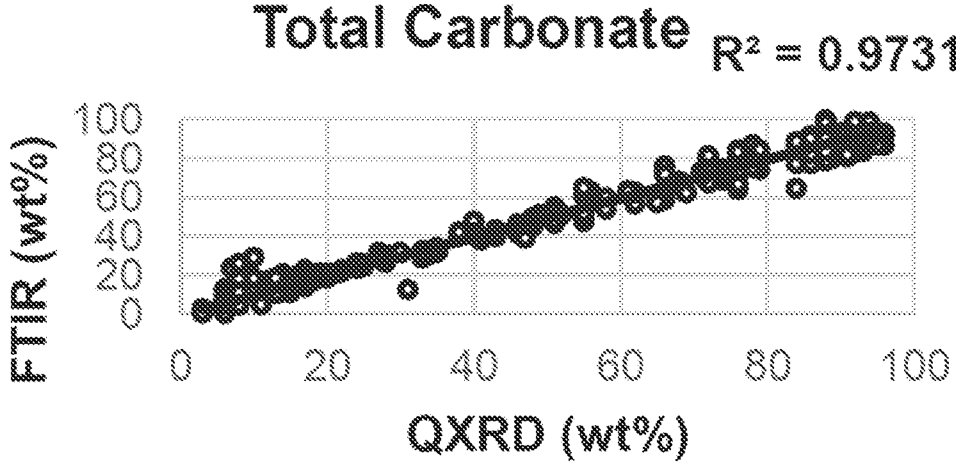
FIG. 4 is a plot comparing measurements of the weight fraction of carbonate in the same rock samples using quantitative X-ray diffraction (QXRD) and calibrated Fourier-transform infra-red spectroscopy (FTIR)
Figure 5:
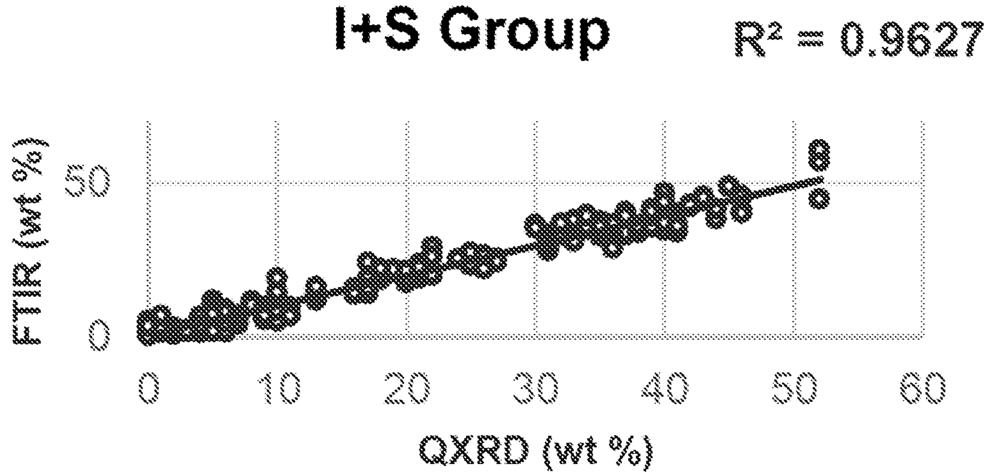
FIG. 5 is a plot comparing measurements of the weight fraction of I+S Group in the same rock samples using quantitative X-ray diffraction (QXRD) and calibrated Fourier-transform infra-red spectroscopy (FTIR)
Figure 6:
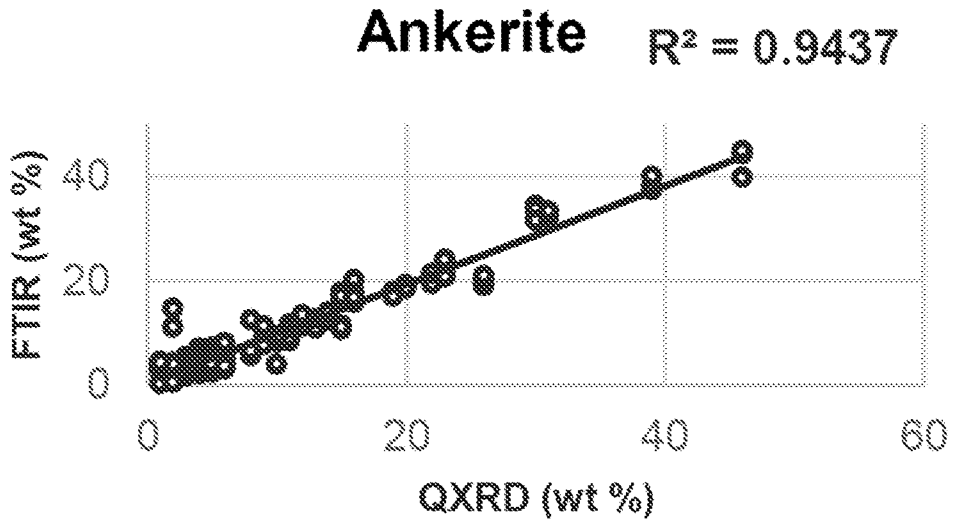
FIG. 6 is a plot comparing measurements of the weight fraction of ankerite in the same rock samples using quantitative X-ray diffraction (QXRD) and calibrated Fourier-transform infra-red spectroscopy (FTIR)
Figure 7:
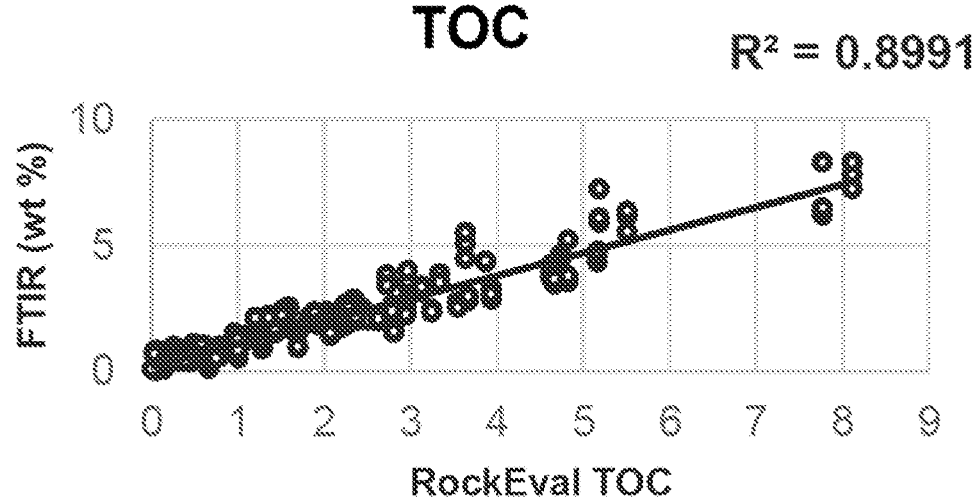
FIG. 7 is a plot comparing measurements of the weight fraction of total organic carbon (TOC) in the same rock samples using quantitative X-ray diffraction (QXRD) and calibrated Fourier-transform infra-red spectroscopy (FTIR)
Figure 8:
FIG. 8 is a plot comparing measurements of the Rock-Eval S1 pyrolysis parameter for the same rock samples using Rock-Eval pyrolysis analysis and calibrated Fourier-transform infra-red spectroscopy (FTIR)
Figure 8:
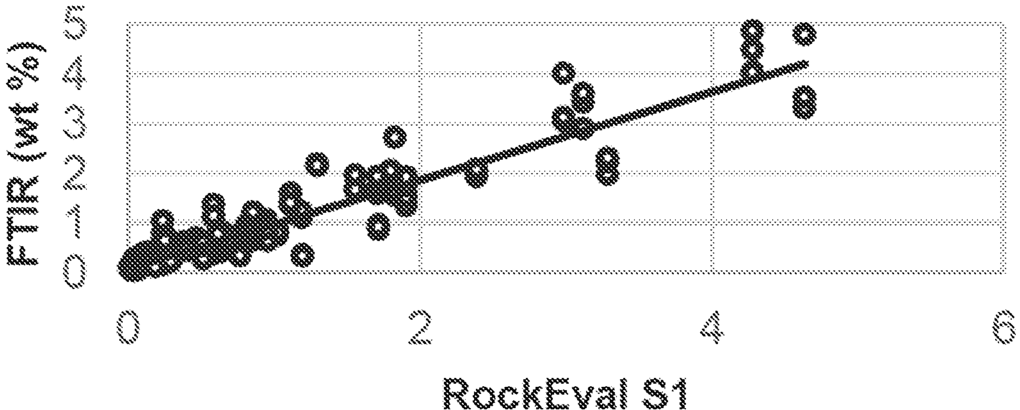
Figure 9:
FIG. 9 is a plot comparing measurements of the Rock-Eval S2 pyrolysis parameter for the same rock samples using Rock-Eval pyrolysis analysis and calibrated Fourier-transform infra-red spectroscopy (FTIR)
Figure 9:
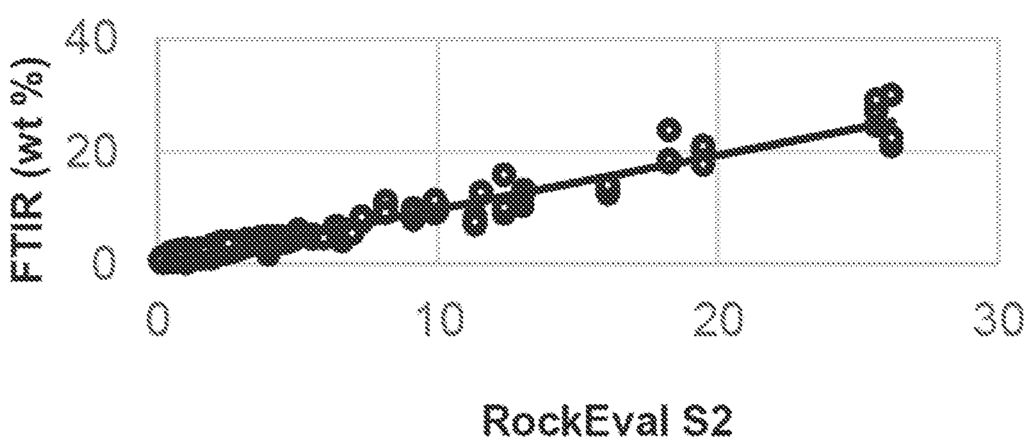

Although it is possible to identify mineralogical phases in spectra such as those obtained from FTIR (as seen in FIG. 1), spectroscopic methods are not conventionally considered suitable for determining the mineral composition of a sample in a quantitative manner because the shape and height of the individual spectral peaks depend on inter-atomic bonding rather than mineralogy or crystal structure. Instead, quantitative methods such as quantitative X-ray diffraction (QXRD) are traditionally used to determine the mineralogical composition of rock samples. However, the present inventors have found that quantitative spectroscopic mineralogical analysis of samples taken from a particular region is possible by fitting a spectroscopic model to a reference dataset compiled using more quantitatively accurate mineralogical analysis techniques, such as QXRD, and a set of reference rock samples taken from the same region.

Similarly, although it is possible to identify the presence of organic phases in FTIR spectra (as seen in FIG. 1), spectroscopic methods are again not conventionally considered suitable for determining the amount of organic phases present in a quantitative manner. Instead, quantitative methods such as combustion analysis (e.g. TOC combustion analysis (for example, using a LECO carbon analyser available from the LECO Corporation, Saint Joseph, Michigan, USA) or pyrolysis analysis (e.g. Rock-Eval pyrolysis using a Rock-Eval analyser available from Vinci Technologies SA, Nanterre, France) methods are traditionally used to determine the organic phase composition of rock samples.

For example, a combustion analyser may be used to combust the organic carbon remaining in a rock sample following chemical removal of inorganic carbon (i.e. carbonates), and to measure the amount of carbon dioxide produced, thereby providing a measurement to the total amount of organic carbon in the sample. In pyrolysis analysis, a rock sample is progressively heated in an inert (i.e. oxygen-free) atmosphere to volatilise any organic material present. Different types of organic material are removed from the rock sample at different temperatures, thereby generating a pyrolysis spectrum. The first (i.e. low-temperature) peak in the spectrum is known as the S1 peak and corresponds to the release of free hydrocarbons (i.e. gas and oil) from the sample. The second peak in the spectrum is known as the S2 peak and corresponds to the release of hydrocarbons formed during thermal pyrolysis of the sample (i.e. thermal cracking of non-volatile organic matter in the sample). The height of the S2 peak therefore provides an indication of the quantity of hydrocarbons for which the rock has a potential of producing should burial and maturation continue. Further peaks S3 and S4 relate to carbon dioxide produced during kerogen pyrolysis and pyrolysis of residual carbon, respectively. Pyrolysis parameters S1, S2, S3 and S4 are the measured heights of the S1, S2, S3 and S4 peaks, respectively, in units of mg Hc/g rock. The amount of total organic carbon in the sample (in wt. %) can be calculated from the pyrolysis peaks according to $$\%\ TOC = \frac{(0.082(S1 + S2) + S4)}{10}. \tag{1}$$

The amount of TOC measured by a combustion method does not include a measurement of the free hydrocarbons present in the sample, as these will tend to be volatilised when samples are dried after chemical treatment to remove inorganic carbonate minerals. Accordingly, if a rock sample has a high free hydrocarbon content, the TOC value obtained using a combustion method will be smaller than that obtained by pyrolysis, which includes free hydrocarbons (i.e. the S1 peak) in the TOC calculation according to Equation (1).

By normalising the value of the S1 parameter obtained from pyrolysis analysis by the measure of TOC, a parameter indicative of the amount of moveable hydrocarbons in the rock sample can be obtained. Rocks having high S1:TOC ratios will tend to contain more producible hydrocarbons than rocks having low S1:TOC ratios. Accordingly, wells producing rock samples having high S1:TOC ratios have a greater potential for hydrocarbon production.

However, it is not conventionally considered possible to determine the S1:TOC ratio for rock cuttings samples obtained from hydrocarbon wells as such samples are typically contaminated with drilling fluids such as oil based mud (OBM). This contamination is problematic because, although OBM must be removed from the samples using solvent in order to obtain accurate measurements of the S1 peak, the OBM removal process itself removes moveable oil from the samples and therefore negatively affects the measured S1 value.

However, the present inventors have found that quantitative measurements of carbon content can again be achieved by using a spectroscopic model fitted to a reference dataset compiled using, for example, TOC combustion (e.g. LECO) or pyrolysis (e.g. Rock-Eval) analysis methods as applied to reference rock samples from the region.

In the new calibrated spectroscopic methods developed by the inventors, a training data set of reference mineralogical and/or carbon content data is compiled using, e.g., QXRD, TOC combustion (e.g. LECO) and/or pyrolysis (e.g. Rock-Eval) analysis methods. The reference training data set is compiled by measuring the mineralogical and carbon content data for a plurality of different core samples of rock taken from a region. It has been found that a minimum of around 30 samples is typically required to build a representative training data set.

The reference training data set includes, for example, the amount (e.g. volume fraction) of each mineralogical phase in each sample, as well as measurements of the organic phases present (e.g. in terms of the TOC content and/or S1 and/or S2 parameters) in each sample. In addition, an FTIR spectrum (or other suitable spectroscopic spectrum) is obtained for each sample using an FTIR instrument (for example, an ALPHA FTIR spectrometer available from Bruker Corporation, Billerica, MA, United States of America) to compile an FTIR training data set. The FTIR training data set is then fit to the reference training data set using a multivariate statistical approach such as a least squares regression methodology (for example, using the OPUS spectroscopy software available from Bruker Corporation, Billerica, MA, United States of America). The FTIR spectra are matched to the mineralogical and organic components in the reference training data set and used to build a calibration model (also referred to as a chemometric model). In particular, multivariate calibration algorithms such as Partial Least Squares (PLS), as implemented in the OPUS spectroscopy software, can be used to correlate spectral intensity (e.g. absorbance values) in specified FTIR wavelength regions (i.e. peak areas in an FTIR spectrum) with concentration values for constituents in the reference training data set.

In the method developed by the inventors, cross-validation techniques are used to determine the quality of the calibration. Cross validation is a statistical process whereby a model is validated using the data points within it. For example, in a model fit to data obtained from 30 samples, cross validation could involve using the model to predict the results which would be expected for each of the 30 samples, one at a time, based on the data obtained from the other 29 samples in the set.

Once the calibration model has been built, it can be used to determine the mineral and/or organic content of an unknown rock sample based on a measured FTIR spectrum. This method is particularly suitable for the compositional analysis of large volumes of cuttings samples extracted from hydrocarbon wells, in particular due to the speed of the FTIR analysis and the subsequent comparison with the calibration model. For example, the inventors have found that the composition of a cuttings sample can be analysed within about 30 seconds, and an atmospheric calibration of only about 30 seconds is required between sequential sample analyses. Accordingly, the method is suited to the compositional analysis of cuttings samples from hydrocarbon wells during drilling.

Moreover, the inventors have found that it is possible to predict S1 or S2 parameter values for a cuttings sample based on suitably calibrated FTIR measurements, even though the S1 and S2 parameters are not themselves associated with any specific FTIR spectral peaks. Without wishing to be bound by theory, the inventors posit that this result is achieved because specific S1 and S2 parameter values are associated with corresponding organo-material facies groups in the training dataset, and the organo-material facies are not affected by core sample to cuttings sample transformations, i.e. it is possible to determine the organo-material facies from FTIR analysis of the cuttings sample (as the FTIR spectrum will be essentially the same as that of the corresponding core sample), even though free hydrocarbons may have been removed from the sample prior to analysis.

In a variant of this method, an alert is triggered if a measured FTIR spectrum cannot be matched sufficiently accurately to the calibration model. Accuracy of a match can be assessed in terms of the distance of a measured FTIR spectrum from the calibration model, for example in terms of the Mahalanobis distance (which is a multidimensional generalisation of the method of using the number of standard deviations from the mean to quantify distance). If an alert is triggered, new reference mineralogical and/or organic content measurements are performed on the sample (i.e. using QXRD, TOC combustion (e.g. LECO) and/or pyrolysis (e.g. Rock-Eval) analysis methods, etc.) and the resultant data, as well as the measured FTIR spectrum, are incorporated into the existing calibration model, thereby extending the range of calibration. This enables the model to be developed and improved on-the-fly.

The skilled person will appreciate that the methods and calculations described hereinabove are suited to automation and implementation in computer software (for example, computer software 102 stored on a computer-readable medium 101, for execution by a computer processor 100, as shown in FIG. 20).

Results

FIGS. 2 to 9 illustrate how accurately FTIR measurements can be fit to QXRD and Rock-Eval reference measurements when training the calibration model for the new spectroscopic. In particular, the weight percentage amount of quartz, illite-smectite (I-S) group minerals, feldspar, ankerite, total carbonate and TOC (by Rock-Eval pyrolysis), as well as Rock-Eval parameters S1 and S2, were measured for each sample. As can be seen, there is a strong correlation (as quantified by the coefficient of determination, $R^2$) between the FTIR results and the QXRD or Rock-Eval measurements, although the correlations tend to become less precise as the volume of a rock component falls below 5%.

The inventors have found that the initial calibration of the model is important. For example, FIGS. 10 (*a*) to (*c*) show how the coefficient of determination, $R^2$, increases as more reference rock samples are included when compiling the training data set. As mentioned hereinabove, a minimum of around 30 different samples in the training data set is typically required to build to a predictive model.

The inventors have also found that results can be improved for measurements taken in a particular region by including multiple samples taken from the "zone of interest" when compiling the training data set. In particular, it is important that the training data set includes samples having relatively similar mineralogies to (i.e. having the same mineral phases within the same compositional ranges as) the rock found in the region to be analysed. For example, the inventors found errors of up to 20% in terms of the predicted quartz content for a sample taken from a hydrocarbon well in one sedimentary basin when using an FTIR model calibrated based on a training set compiled using samples taken from a different sedimentary basin. It would therefore be preferable to compile a specific FTIR calibration model for each basin or region of a basin which rock samples are to be analysed.

Suitably calibrated FTIR models have been used to investigate TOC and S1 parameter variation along lateral hydrocarbon wells in various sedimentary regions.

For example, FIG. 11 (*a*) compares TOC content measured using Rock-Eval pyrolysis and calculated using an FTIR-based model for a number of different core rock samples taken from the Duvernay formation. The rock samples were not washed prior to analysis. FIG. 11 (*b*) is a cross plot of the data shown in FIG. 11 (*a*), illustrating a good agreement between the Rock-Eval measurements and the TOC content predicted using the calibrated FTIR model.

FIGS. 12 (*a*) and (*b*) show similar results as in FIGS. 11 (*a*) and (*b*), except that the FTIR results were obtained followed solvent-washing of the samples. FIGS. 13 (*a*) and (*b*) show similar results as in FIGS. 11 (*a*) and (*b*) and FIGS. 12 (*a*) and (*b*), except that both the FTIR and Rock-Eval results were obtained followed solvent-washing of the samples. As can be seen from FIGS. 12 (*b*) and 13 (*b*), solvent washing of the samples does not reduce the accuracy of the TOC content prediction.

FIG. 14 (*a*) compares TOC content measured using LECO combustion analysis and calculated using an FTIR-based model for a number of different core rock samples taken from the Permian Basin. FIG. 14 (*b*) is a cross plot showing the agreement between both LECO and Rock-Eval measurements and the TOC content predicted using a calibrated FTIR model for the Permian Basin.

FIG. 15 is a cross plot showing the agreement between Rock-Eval measurements of the S1 pyrolysis parameter, and the values of S1 predicted using a calibrated FTIR model, for a plurality of core samples from the Permian Basin. FIG. 16 is also a cross plot showing the agreement between Rock-Eval measurements of the S1 pyrolysis parameter, and the values of S1 predicted using a calibrated FTIR model, incorporating further core samples from the Permian Basin.

FIG. 17 compares values of the S1 pyrolysis parameter measured using Rock-Eval pyrolysis and predicted using a calibrated FTIR model for a plurality of unknown core samples (i.e. core samples which were not included in the training data set when calibrating the FTIR model) from the Permian Basin.

FIG. 18 compares values of the S1 pyrolysis parameter measured using Rock-Eval pyrolysis and predicted using a calibrated FTIR model based on FTIR measurements carried out on both solvent-washed and unwashed unknown core samples from the Duvernay formation.

FIG. 19 shows measurements of rock quartz content, 1+S group content, carbonate content and TOC content obtained using calibrated FTIR as a function of measured depth (MD) along a lateral hydrocarbon well. The measurements were carried out using cuttings samples obtained during drilling. The well path (in terms of total vertical depth (TVD) and MD) is shown in the uppermost panel of the Figure in addition to a gamma ray log (shaded in grey).

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method comprising identifying a constituent phase in a rock sample based on a spectroscopic measurement obtained from the rock sample and determining an amount of the constituent phase in the rock sample based on the spectroscopic measurement obtained from the rock sample, wherein determining the amount of the constituent phase in the rock sample comprises:

obtaining a spectroscopic measurement from the rock sample; and determining the amount of the constituent phases in the rock sample based on the spectroscopic measurement and a spectroscopic calibration model which defines a relationship between spectroscopic measurements and constituent phase amounts for rock samples.

2. The method according to claim 1, wherein the spectroscopic measurement is obtained by infra-red spectroscopy, for example Fourier Transform Infra-red (FTIR) spectroscopy.

3. The method according to claim 1, wherein the method comprises determining a respective amount of two or more constituent phases in the rock sample based on the spectroscopic measurement obtained from the rock sample.

4. The method according to claim 1, wherein the amount of the constituent phase in the rock sample is a parameter indicative of a volume of the constituent phase in the rock sample, such as a volume or a volume fraction of the constituent phase in the rock sample.

5. The method according to claim 1, wherein the constituent phase is a mineralogical phase or an organic phase.

6. The method according to claim 1, wherein the rock sample is a cuttings sample.

7. A method comprising:

providing spectroscopic measurement data obtained from a plurality of reference rock samples;

providing corresponding constituent phase compositional measurement data obtained from the same plurality of reference rock samples, wherein constituent phase compositional measurement data obtained from a reference rock sample comprising measurements of an amount of one or more constituent phases in the reference rock sample is indicative of an amount of one or more constituent phases in the reference rock sample; and fitting a spectroscopic calibration model to the spectroscopic measurement data and the corresponding constituent phase compositional measurement data, wherein the spectroscopic calibration model defines a relationship between the spectroscopic measurement data and the corresponding constituent phase compositional measurement data for the plurality of reference rock samples.

8. The method according to claim 7, wherein the spectroscopic measurement data is infra-red spectroscopic measurement data, for example Fourier Transform Infra-red (FTIR) spectroscopic measurement data.

9. The method according to claim 7, wherein the constituent phase compositional measurement data obtained from a reference rock sample comprises mineralogical phase compositional measurement data comprising measurements of an amount of one or more mineralogical phases in the reference rock sample.

10. The method according to claim 9, wherein the measurements of the amount of one or more mineralogical phases in the reference rock sample are XRD measurements of the amount of one or more mineralogical phases in the reference rock sample.

11. A method comprising determining a value of a pyrolysis parameter for a rock sample based on a spectroscopic measurement obtained from the rock sample wherein determining the value of the pyrolysis parameter for the rock sample comprises:

obtaining a spectroscopic measurement from the rock sample; and determining the value of the pyrolysis parameter for the rock sample based on the spectroscopic measurement and a spectroscopic calibration model which defines a relationship between spectroscopic measurements and values of the pyrolysis parameter for rock samples.

12. The method according to claim 11, wherein the spectroscopic measurement is obtained by infra-red spectroscopy, for example Fourier Transform Infra-red (FTIR) spectroscopy.

13. The method according to claim 11, wherein the pyrolysis parameter is indicative of the amount of free hydrocarbons in the rock sample, for example wherein the pyrolysis parameter is the S1 pyrolysis parameter.

14. The method according to claim 11, wherein the rock sample is a cuttings sample.

15. A method comprising:

providing spectroscopic measurement data obtained from a plurality of reference rock samples;

providing corresponding pyrolysis parameter measurement data obtained from the same plurality of reference rock samples; and fitting a spectroscopic calibration model to the spectroscopic measurement data and the corresponding pyrolysis parameter measurement data, wherein the spectroscopic calibration model defines a relationship between the spectroscopic measurement data and the corresponding pyrolysis parameter measurement data for the plurality of reference rock samples.

16. The method according to claim 15, wherein the spectroscopic measurement data is infra-red spectroscopic measurement data, for example Fourier Transform Infra-red (FTIR) spectroscopic measurement data.

17. A method comprising determining an amount of an organic phase in a rock sample based on a spectroscopic measurement obtained from the rock sample wherein determining the amount of the organic phase in the rock sample comprises:

obtaining a spectroscopic measurement from the rock sample; and determining the amount of the organic phase in the rock sample based on the spectroscopic measurement and a spectroscopic calibration model which defines a relationship between spectroscopic measurements and organic phase amounts for rock samples.

18. The method according to claim 17, wherein the spectroscopic measurement is obtained by infra-red spectroscopy, for example Fourier Transform Infra-red (FTIR) spectroscopy.

19. The method according to claim 17, wherein the amount of the organic phase in the rock sample is the amount of total organic carbon (TOC) in the rock sample.

20. The method according to claim 17, wherein the rock sample is a cuttings sample.

21. A method comprising:

providing spectroscopic measurement data obtained from a plurality of reference rock samples;

providing corresponding organic phase compositional measurement data obtained from the same plurality of reference rock samples; and fitting a spectroscopic calibration model to the spectroscopic measurement data and the corresponding organic phase compositional measurement data, wherein the spectroscopic calibration model defines a relationship between the spectroscopic measurement data and the corresponding organic phase compositional measurement data for the plurality of reference rock samples.

22. The method according to claim 21, wherein the spectroscopic measurement data is infra-red spectroscopic measurement data, for example Fourier Transform Infra-red (FTIR) spectroscopic measurement data.

23. The method according to claim 21, wherein the organic phase compositional measurement data obtained from the reference rock samples comprises measurements of the amount of total organic carbon (TOC) in each reference rock sample.

24. The method according to claim 23, wherein the measurement of the amount of total organic carbon in each reference rock sample is a combustion analysis measurement of the amount of TOC in the reference rock sample.

* * * * *